(12) United States Patent
Shikata

(10) Patent No.: US 8,258,669 B2
(45) Date of Patent: Sep. 4, 2012

(54) MOTOR WITH STATOR CONFIGURATION FOR INCREASED COIL LENGTH AND COIL SPACE FACTORS

(75) Inventor: Satoshi Shikata, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 12/783,988

(22) Filed: May 20, 2010

(65) Prior Publication Data

US 2010/0295405 A1    Nov. 25, 2010

(30) Foreign Application Priority Data

May 21, 2009  (JP) .................................. 2009-122966
Jun. 16, 2009  (JP) .................................. 2009-143154

(51) Int. Cl.
*H02K 1/06*  (2006.01)
*H02K 3/00*  (2006.01)

(52) U.S. Cl. ................. 310/216.069; 310/179; 310/208; 310/216.074; 310/216.091

(58) Field of Classification Search ........... 310/216.009, 310/216.069–216.073, 184, 179, 195, 208, 310/216.074, 216.091
See application file for complete search history.

(56) References Cited

U.S. PATENT DOCUMENTS

| | | | |
|---|---|---|---|
| 4,197,477 A * | 4/1980 | Reynolds ...................... 310/264 |
| 5,583,387 A * | 12/1996 | Takeuchi et al. ....... 310/216.009 |
| 6,140,735 A * | 10/2000 | Kato et al. ..................... 310/201 |
| 7,049,725 B2 * | 5/2006 | Blouin et al. .......... 310/216.012 |
| 7,432,625 B2 * | 10/2008 | Adaniya et al. ............... 310/180 |
| 7,683,517 B2 * | 3/2010 | Fukasaku et al. ............. 310/180 |
| 2006/0283004 A1 * | 12/2006 | Ooiwa ............................. 29/596 |
| 2008/0093948 A1 * | 4/2008 | Naganawa .................... 310/203 |

FOREIGN PATENT DOCUMENTS

| | | |
|---|---|---|
| EP | 1174982 A2 | 1/2002 |
| JP | 57-148544 | 9/1982 |
| JP | 59-127547 | 7/1984 |

(Continued)

OTHER PUBLICATIONS

JPO Machine Translation, 2001-157422, Dec. 6, 2011.*

(Continued)

*Primary Examiner* — Quyen Leung
*Assistant Examiner* — Thomas Truong
(74) *Attorney, Agent, or Firm* — Nelson Mullins Riley & Scarborough LLP; Anthony A. Laurentano

(57) ABSTRACT

A motor including a stator and rotor. The stator includes a stator core, slot portions and coils. The stator core includes stator core pieces with teeth portion having a distal end portion and two side portions, a yoke portion, and a claw portion formed at one of the two side portions. At the distal end portion, the stator core pieces are connected so that claw portions protrude in the same circumferential direction to form the stator core into a cylindrical shape. The slot portions are formed between adjacent teeth portions and between the stator core pieces. The coils form three phases which are inserted into the slot portions, are bridged between two of the slot portions and include end portions that protrude from an edge face of the stator core in an axial direction. The coils are arranged so that the end portions are intersected with each other.

3 Claims, 34 Drawing Sheets

FOREIGN PATENT DOCUMENTS

| | | |
|---|---|---|
| JP | 63-161831 | 7/1988 |
| JP | 2-60438 | 2/1990 |
| JP | 2-276443 | 11/1990 |
| JP | 9-9535 | 1/1997 |
| JP | 9-103052 | 4/1997 |
| JP | 10-271733 | 10/1998 |
| JP | 2001-157422 | 6/2001 |
| JP | 2002-44893 | 2/2002 |
| JP | 2002-291184 | 10/2002 |
| JP | 2002-335642 | 11/2002 |
| JP | 2003-235192 | 8/2003 |
| JP | 2005-528878 | 9/2005 |
| JP | 2006-353013 | 12/2006 |
| JP | 2007-512797 | 5/2007 |
| JP | 2007-274808 | 10/2007 |
| JP | 2008-283736 | 11/2008 |
| WO | 03/105317 A1 | 12/2003 |
| WO | 2005/050816 A2 | 6/2005 |

OTHER PUBLICATIONS

JPO Machine Translation, 2008-283736, Dec. 6, 2011.*
Japanese Office Action for Application No. 2009-122966, dated Apr. 12, 2011.
Japanese Office Action for Application No. 2009-143154, dated Apr. 19, 2011.
European Search Report for Application No. 10163377.4, dated Feb. 15, 2011.

* cited by examiner

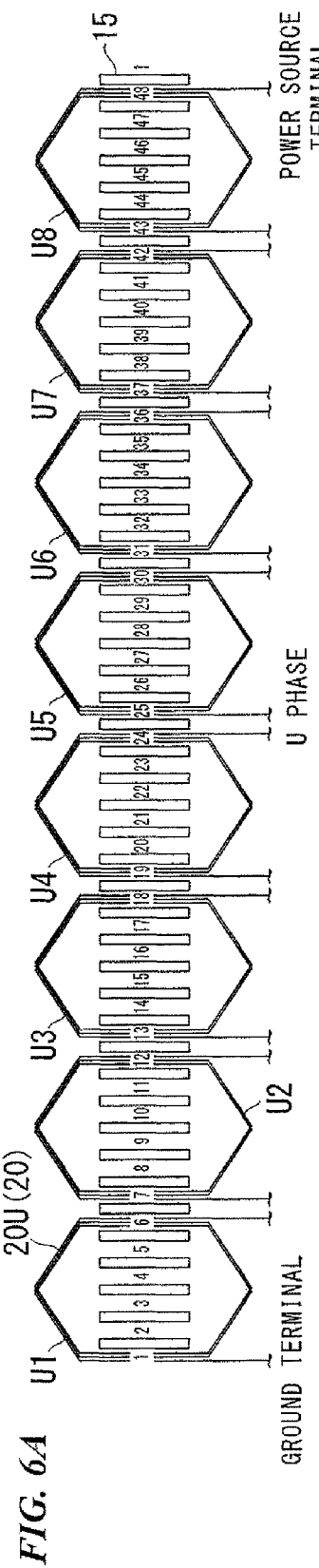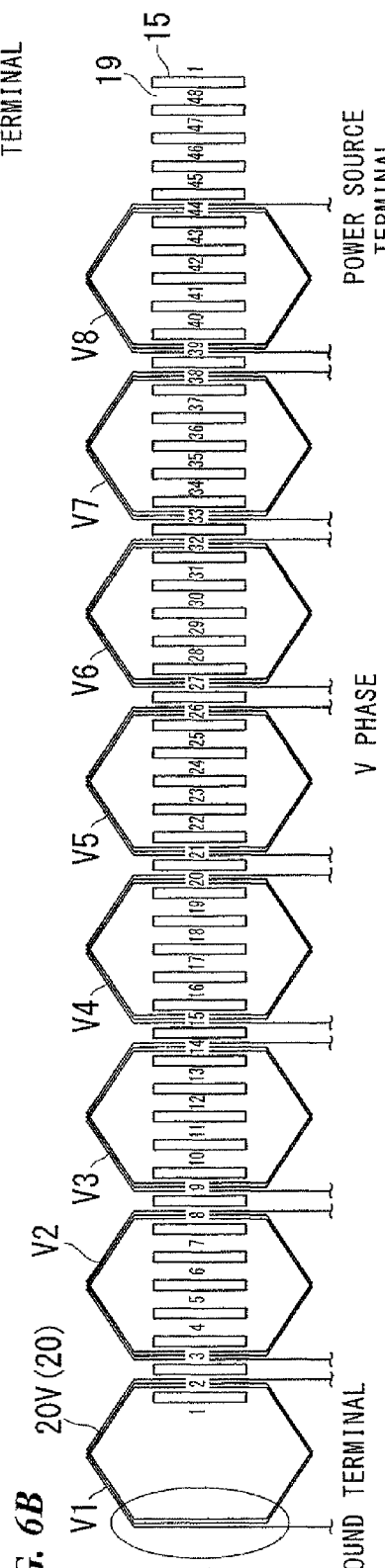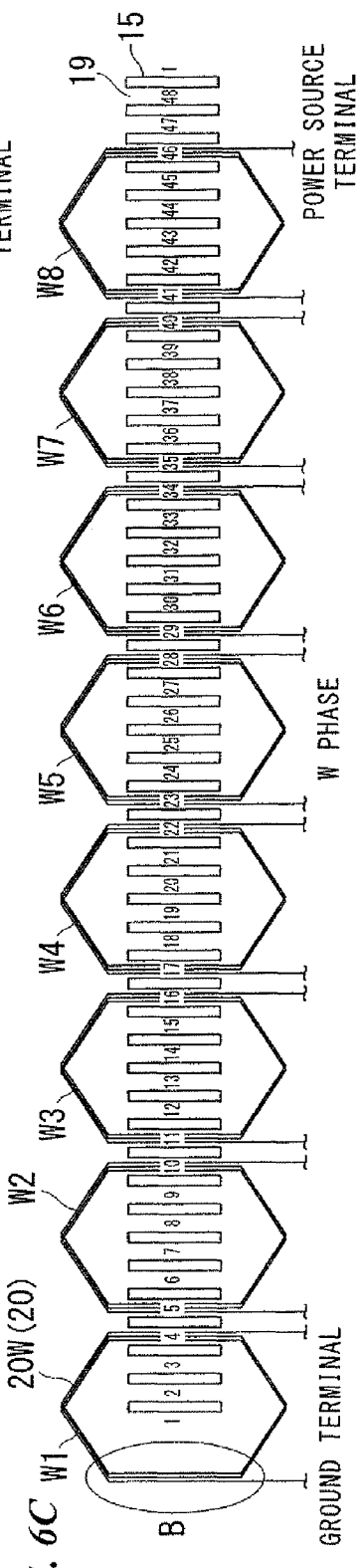

*FIG. 11*
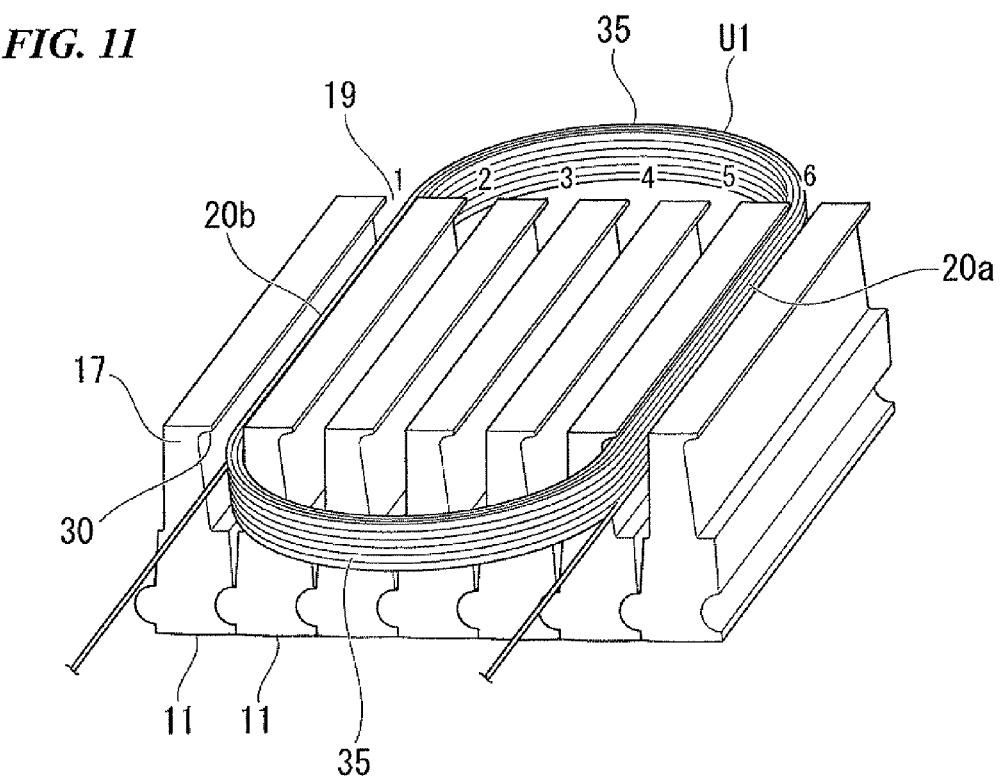
*FIG. 12A*  *FIG. 12B*
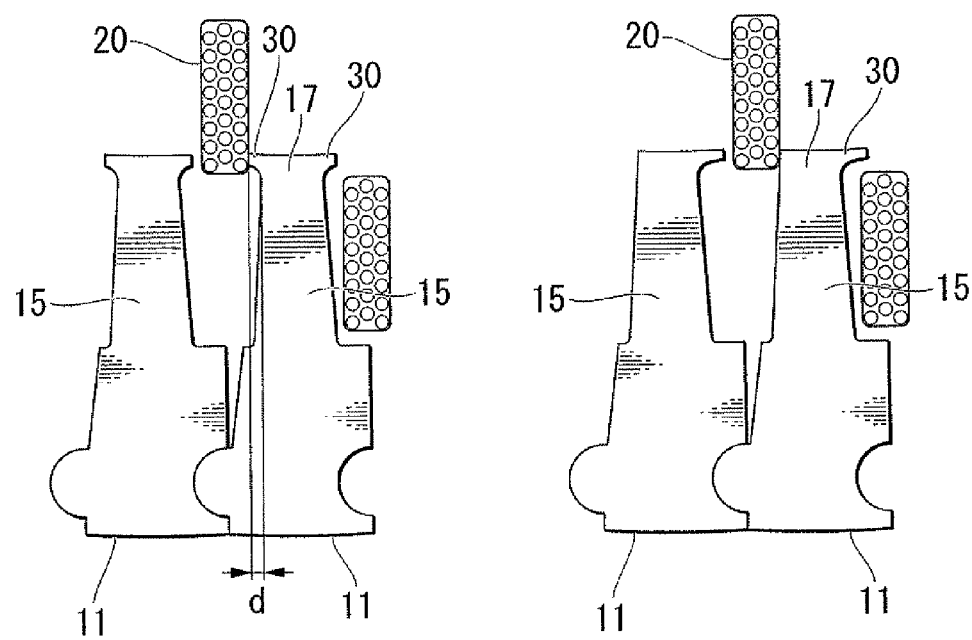

*Prior Art*

*Prior Art*

*Prior Art*

MOTOR WITH STATOR CONFIGURATION FOR INCREASED COIL LENGTH AND COIL SPACE FACTORS

BACKGROUND OF THE PRESENT INVENTION

1. Field of the Present Invention

The present invention relates to a motor.

This application claims priority from Japanese Patent Application No. 2009-122966, filed on May 21, 2009, and Japanese Patent Application No. 2009-143154, filed on Jun. 16, 2009, the contents of which are incorporated herein by reference.

2. Description of Related Art

Conventionally, an inner rotor type of motor is known. An inner rotor motor includes a cylindrical stator and a rotor (rotating element).

An inner rotor motor disposes a rotor in a space formed on an inner side of a stator to thereby enable rotation of the rotor with respect to the stator.

Furthermore, coils are wound in a slot portion formed between teeth portions adjacent to the stator. Methods including distributed winding or concentrated winding are known as manufacturing methods for winding coils.

Generally, a configuration in which coils are wound using distributed winding facilitates maintenance of high torque density performance. Consequently, distributed winding is employed in motors which require high torque.

However, distributed winding differs from concentrated winding in that coils are wound by suspending between slot portions that are separated by a predetermined distance. Thus, the method of winding the coils is more complicated, time is required for the coil winding operation and production efficiency is adversely affected.

In contrast, in order to improve coil density (space factor) in a slot portion and to improve the efficiency of the coil winding operation, a conventional method has been proposed in Japanese Unexamined Patent Application, First Publication No. H09-103052. In this method, the stator is partitioned, coils are wound by arranging stator core pieces in a band orientation, and then the stator core pieces are formed in a cylindrical shape to thereby manufacture the stator.

The method of winding coils disclosed in Japanese Unexamined Patent Application, First Publication No. H09-103052 increases the height of the coil end portions protruding from both axial end faces of the stator towards an outer side of the stator. In order to eliminate this height increase, Japanese Unexamined Patent Application, First Publication No. 2002-44893 proposes a coil winding methods which reduces the height of the coil end portion to downsize the motor.

More specifically, the stator disclosed in Japanese Unexamined Patent Application, First Publication No. 2002-44893 has a distributed winding structure as shown in FIG. 38 to reduce the overhang height of the coil end portion of the stator.

As shown in FIG. 38, a second winding W31 which has a different phase to the first windings U31 is stored in a slot (slot number 3) between the two slots (slots numbers 1 and 6) storing a first winding U31. A third winding W36 which has the same phase as the second winding W31 is stored in the slot (slot number 2) between the two slots storing the first winding U31. The third winding W36 is positioned on an outer-peripheral side of the first winding U31 in the coil end portion. The second winding W31 is positioned on an inner-peripheral side of the first winding U31.

However, when the method disclosed in Japanese Unexamined Patent Application, First Publication No. 2002-44893 is used to wind coils and thereafter a stator is manufactured by arranging a plurality of stator core pieces into a cylindrical shape, there is the problem in that the resistance produced in the coil increases and motor performance is adversely affected. Furthermore, there is the problem in that the insulation characteristics of the coil are reduced.

SUMMARY OF THE PRESENT INVENTION

The present invention is proposed in light of the above matters and provides a motor that enables an overall coil length to be shortened and which improves the space factor of the coils. Furthermore, the present invention provides a motor that enables a reduction in an amount of coil deformation.

In order to improve the space factor of the coil in the slot portion, improve the efficiency of the coil winding operation, and downsize the motor, the present inventors conducted diligent research for a method of manufacturing a stator by using the method disclosed in Japanese Unexamined Patent Application, First Publication No. 2002-44893 in a state in which the stator core pieces are arranged in a band shape to thereby wind the coils as shown in FIG. 38, and thereafter arrange the plurality of stator core pieces in a cylindrical shape.

In this case, as shown in FIG. 39, an arrangement is required in which coils 220 that are formed as an annular shape are suspended in slot portions 219 formed between teeth portions 215 and 215 of stator core pieces 211 and 211 that are separated by a predetermined distance. Furthermore, as shown in FIG. 40, coil end portions 235U, 235V, and 235W for coils 220U, 220V, and 220W of each phase must be disposed in an mutually crossing-over orientation.

More specifically, as shown in FIG. 41, the opposed surface area of a stator and a rotor in a distal end portion 217 of the teeth portion 215 is generally made as large as possible by forming a claw portion 230 that protrudes in a peripheral direction in a cylindrical state to protrude in a substantially symmetrical orientation on both sides of the teeth portion 215.

Thus, when the coils 220 are disposed in the slot portion 219 of the stator coil pieces 211 that are disposed in a band shape, the annular diameter of the coil 220 must be set taking into account the protruding length in a peripheral direction of the claw portion 230.

In other words, when the annular diameter of the coil 220 is set in this manner, as shown in FIG. 42, a looseness is produced in the coil end portion 235 of the coil 220 in a state in which the stator coil pieces 211 are connected in an annular shape to thereby form the stator 201. As a result, the overall length of the coil 220 increases and the resistance produced by the coils 220 also increases which causes the problem in that motor performance is adversely affected.

Furthermore, when forming the band-shaped stator core pieces 211 into an annular shape, the length of the coil end portion 235 of the coil 220 is excessive, and the height of the coil end portion 235 increases which causes the problem in that the motor cannot be downsized.

In order to solve the above-described problems, a motor of the present invention includes a stator and a rotor. The stator includes a stator core, a plurality of slot portions, and a plurality of coils, the stator core including a plurality of stator core pieces, the stator core piece including a teeth portion having a distal end portion and two side portions, a yoke portion, and a claw portion formed at one of the two side portions and at the distal end portion, the plurality of stator core pieces being connected so that a plurality of claw portions protrude in the same circumferential direction, the stator core thereby being formed in a cylindrical shape, each of the slot portions being formed between adjacent teeth portions and formed between the plurality of stator core pieces, the plurality of coils being inserted into the plurality of slot portions, the plurality of coils including a first coil, a second coil, and a third coil which form three phases, the first coil, the second coil, and the third coil being bridged between two of the slot portions, the first coil including a first coil end portion that protrudes from an edge face of the stator core in an axial direction, the second coil including a second coil end portion that protrudes from the edge face of the stator core in the axial direction, and the third coil including a third coil end portion that protrudes from the edge face of the stator core in the axial direction, the first coil, the second coil, and the third coil being arranged so that the first coil end portion, the second coil end portion, and the third coil end portion are intersected with each other. The rotor is disposed at an inner-peripheral side of the stator and rotatably supported.

It is preferable that, in the motor of the present invention, the plurality of stator core pieces include an inclined face, the inclined face be formed on the side portion on which the claw portion is not formed, and the inclined face cause the width of the teeth portion to be decreased in a direction from a radial-outer side toward radial-inner side of the plurality of stator core formed in a cylindrical shaped.

Furthermore, in order to downsize the motor, improve the efficiency of the coil winding operation, and improve the coil space factor in the slot portions, the present inventors conducted diligent research into a method of manufacturing a stator by using the method disclosed in Japanese Unexamined Patent Application, First Publication No. 2002-44893 in a state in which the stator core pieces are arranged in a band shape to thereby wind the coils as shown in FIG. 38, and thereafter arrange the plurality of stator core pieces in a cylindrical shape.

In this case, as shown in FIG. 39, an arrangement is required in which coils 220 that are formed as an annular shape are suspended in the slot portions 219 formed between the teeth portions 215 and 215 of the stator core pieces 211 and 211 that are separated by a predetermined distance. Furthermore, as shown in FIG. 40, coil end portions 235U, 235V, and 235W for the coils 220U, 220V, and 220W of each phase must be disposed in an mutually crossing-over orientation.

More specifically, firstly, one end of a coil 220 having a predetermined phase is disposed in the slot portion 219. Then, a coil 220 having a different phase to the predetermined phase is disposed in a desired slot portion 219 adjacent to the first slot portion 219. Thereafter, the other end of the coil 220 that has the first predetermined phase must be arranged into a separate desired slot portion 219.

When a plurality of poles and a plurality of slots and multipole slots are used as shown in FIG. 43, in order to avoid interference between adjacent coils, the coil 220 that protrudes from the slot portion 219 is extremely deformed in coil end portions that protrude from the slot, and the coil end portion 235 is thereby passed over a yoke portion.

In this manner, when the deformation amount of the coil 220 increases, as shown in FIGS. 44 and 45, the coating on the lead wire that forms the coil 220 may break in the curved portion C of the lead wire that forms the coil 220 and therefore a problem arises in relation to a reduction in the insulation characteristics of the coil 220.

In order to solve the above-described problems, it is preferable that, in the motor of the present invention, the coils include a first portion and a second portion that is opposite to the first portion; in two slot portions, the first portion be inserted into one of the slot portions, and the second portion be inserted into the other of the slot portions; and in two coils that are adjacent to each other and have the same phase, the first portion of one of the coils and the second portion of the other of the coils be inserted into one slot portion.

It is preferable that the motor of the present invention further include a step portion formed on an inner peripheral face facing the slot portion in the yoke portion. In the motor, in two coils that are adjacent to each other, that have the same phase, and that constitute each of the first coil, the second coil, and the third coil, the position of the first portion of one of the coils be shifted from the position of the second portion of the other of the coils in a radial direction.

It is preferable that, in the motor of the present invention, each of the plurality of stator core pieces have the claw portion that is formed only at one of two side portions at the distal end portion of the teeth portion; the claw portion have a side face facing the slot portion; the side face have a first inclined face and a second inclined face, the first inclined face being formed toward a distal end of the claw portion from the teeth portion, and the second inclined face being consecutively connected and formed so as to extend toward the distal end of the claw portion; and an angle between the first inclined face and a side face of the slot portion be less than an angle between the second inclined face and the side face of the slot portion.

In addition, a method for manufacturing the stator constituting the above-described motor, the method includes: preparing a plurality of stator core pieces including a teeth portion having a distal end portion and two side portions, a yoke portion, and a claw portion formed at one of the two side portions and at the distal end portion; preparing a plurality of annular-shape coils including a first portion and a second portion that is opposite to the first portion; arranging the plurality of stator core pieces in a band orientation so that the plurality of the claw portion face in the same direction (core pieces arrangement step); obtaining a first slot portion and a second slot portion, the first slot portion being disposed between the teeth portion of the stator core pieces that are adjacent to each other, and the second slot portion being disposed between the teeth portion of the stator core pieces that are adjacent to each other, the second slot portion being provided at a position in a direction opposite to the direction in which the claw portions face with respect to the first slot portion; inserting the first portion of the coils into the first slot portion (coil insert step); causing the coils to be arranged at the stator core pieces by inserting the second portion of the coils into the second slot portion by use of the side portion on which the claw portion is formed, the side portion serving as a supporting point (coil insert step); transforming the plurality of stator core pieces that ware arrayed in a band orientation, thereby protruding the claw portion in a circumferential direction of the plurality of stator core pieces that are arranged in a cylindrical shape (core pieces transformation step); and inserting the coils into the second slot into which the coils were not inserted, the coils to be inserted into the second slot striding the stator core pieces that are positioned at both end portions of the plurality of stator core pieces that are arrayed in a band orientation (stator formation step).

According to the motor of the present invention, the coils can be densely arranged in the slot portions and the space factor of the coils can be improved by arranging the coils because the plurality of stator core pieces are in a band shape.

In the method for manufacturing the stator constituting the above-described motor, when inserting the second portion of ring-shaped coil into the slot portion, the coil reaches the side portion on which the claw portion is not formed in the distal end portion of the teeth portion, and the second portion of the coil is inserted into the slot portion. As a result, the overall length of the coil (reduction in annular diameter) can be reduced.

Furthermore, when inserting the second portion of the ring-shaped coil into the slot portion, the first portion of the coil is in contact with the side portion (side face) that forms the claw portion on the distal end portion of the teeth portion, and the second portion is inserted into the slot portion in that state. Consequently, the overall length of the coils (reduction in annular diameter) can be further reduced.

Thus, resistance produced by the coil can be reduced and it is possible to substantially suppress the height of the coil end portion of the coil protruding from both axial end faces of the stator towards an outer side of the stator.

In addition, the coils can be simply inserted into the slot portion since a sufficient slot size can be ensured by disposing the stator core pieces in a band-shape.

Therefore the effect is obtained that stator production efficiency can be improved.

According to the motor of the present invention, the first coil, the second coil and the third coil that form the three phases are arranged with a plurality of stator core pieces in a band shape. As a result, each coil can be densely arranged in slot portions and the space factor of the coils can be improved.

When inserting the ring-shaped coil into the slot portion, the coil reaches the side portion on which the claw portion is not formed in the distal end portion of the teeth portion, in other words, and the coils pass over the side portion on which the claw portion is not formed in the distal end portion of the teeth portion, and thereby enables insertion of the coils into the slot portion. As a result, the overall length of the coils (reduction in annular diameter) can be reduced and consequently, the resistance produced by the coils can be reduced.

Furthermore, the first coil, the second coil and the third coil are disposed to mutually cross over with a first coil end portion, a second coil end portion and a third coil end portion. Therefore it is possible to substantially reduce the height of the coil end portion that protrudes from both axial ends of the stator towards an outer side of the stator. Consequently the motor can be downsized.

According to the motor of the present invention, when inserting the ring-shaped coils into the slot portion, since the coils pass over the side portion on which the claw portion is not formed in the distal end portion of the teeth portion, the overall length of the coils can be reduced (reduction in annular diameter).

Furthermore, since the inclined face is formed on the side portion (side surface) on which the claw portion is not formed in the distal end portion of the teeth portion, the coils can be smoothly inserted into the slot portion. Furthermore, when inserting the coils into the slot portion, damage to the coil coating resulting from contact of the coils with the edge of the teeth portion can be prevented.

According to the motor of the present invention, two coils of the same phase are inserted into one slot portion to thereby increase the distance between adjacent slot portions. Therefore, the deformation amount in the coil end portion of the coils can be reduced. As a result, it is possible to prevent damage to the coating of the lead line forming the coils and to ensure the insulation characteristics of the coils.

In the motor of the present invention, the claw portion is formed only on one side portion in the distal end portion of the teeth portion. On the other hand, a conventional structure forms the claw portion on both side portions in the distal end portion of the teeth portions, and when inserting coils into the slot portion, it was necessary to avoid the claw portion when inserting. In contrast, in the structure according to the present invention, when inserting the coils into the slot portion, it is not necessary to insert while avoiding the claw portion. In other words, in the structure according to the present invention, it is possible to shorten the overall length of the coils.

Therefore, it is possible to reduce the resistance produced by the coils and to enable considerable suppression to the height of the coil end portion of the coils that protrude from both axial end faces of the stator towards an outer side of the stator.

In the motor of the present invention, the step portion is provided at a position at which two coils of the same phase are inserted into one slot portion. In this manner, the amount of coil deformation can be further reduced.

As a result, damage to the coating of the lead line that forms the coils can be more effectively prevented and the insulation characteristics of the coils can be ensured.

In the motor of the present invention, the claw portion is formed on one side portion of the two side portions on the distal end portion of the teeth portion to thereby enable maximum increase to the width of the claw portion. Consequently, it is possible to reduce torque ripple.

BRIEF DESCRIPTION OF THE DRAWINGS

FIG. 6A is an explanatory diagram illustrating a method for inserting coils into slot portions in the first embodiment of the present invention.

FIG. 6B is an explanatory diagram illustrating a method for inserting coils into slot portions in the first embodiment of the present invention.

FIG. 6C is an explanatory diagram illustrating a method for inserting coils into slot portions in the first embodiment of the present invention.

FIG. 11 is an explanatory diagram illustrating a method for attaching the core pieces on the coil in the first embodiment of the present invention.

FIG. 12A is a diagram illustrating a difference between a structure of the first embodiment of the present invention and a conventional structure, and showing the conventional structure.

FIG. 12B is a diagram illustrating a difference between a structure of the first embodiment of the present invention and a conventional structure, and showing the structure of the first embodiment of the present invention.

DETAILED DESCRIPTION OF THE PRESENT INVENTION

First Embodiment

The preferred embodiments of the present invention will be described below with reference to FIGS. 1 to 16.

Figure 1:
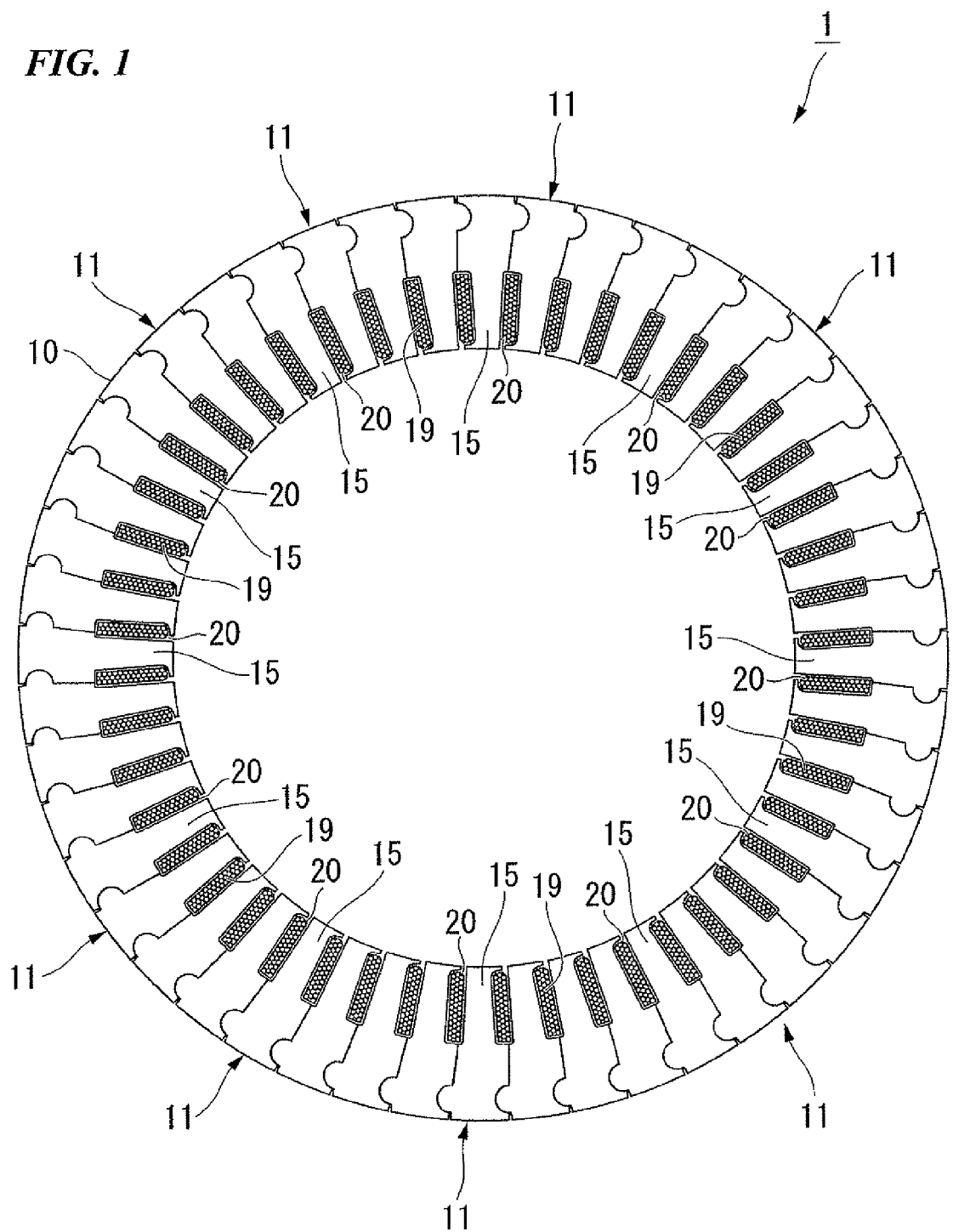
FIG. 1 is a plan view showing a stator of a first embodiment of the present invention.

FIG. 1 is a plan view of a stator.

In FIG. 1, a coil 20 is shown in cross section from an upper end of a stator core 10. As shown in FIG. 1, the stator 1 includes the stator core 10 formed in a cylindrical shape, a plurality of teeth 15 (teeth portions) adjacent to the stator core 10, slots 19 (slot portions) formed between the teeth 15 and 15, and coils 20 disposed on the slots 19.

A rotor (not shown) is rotatably disposed in a space formed in the center of the cylindrical stator 1.

Figure 2:
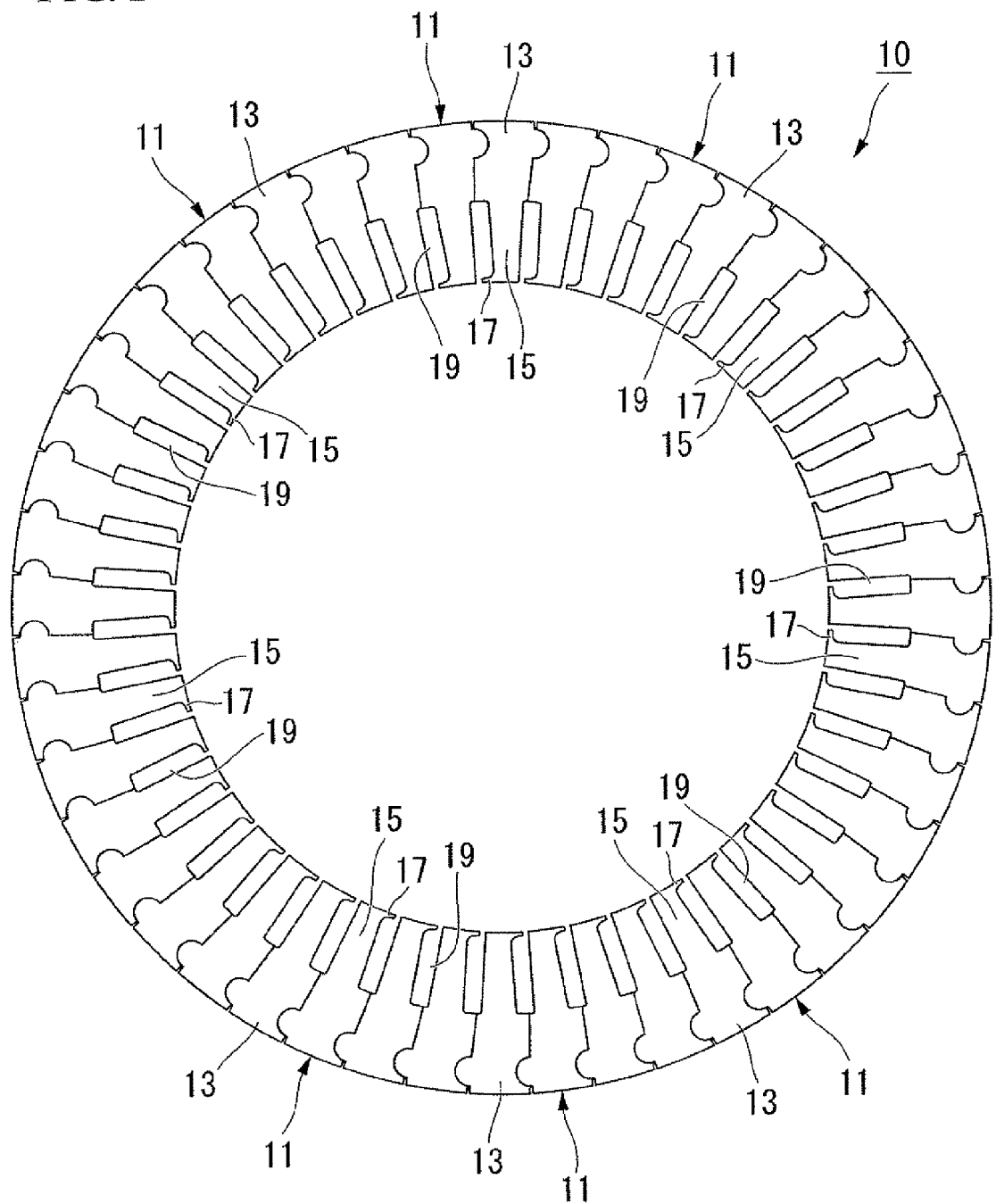
FIG. 2 is a plan view showing the stator core of the first embodiment of the present invention.

FIG. 2 is a plan view of a stator core.

As shown in FIG. 2, the stator core 10 is configured by connecting a plurality of core pieces 11 (stator core pieces) in a cylindrical shape. The stator core 10 includes a yoke 13 (yoke portion) configuring an outer-peripheral of the cylinder, teeth 15 that protrude from the yoke 13 towards the center of the cylinder, and a distal end portion 17 configuring a distal end of the teeth 15. A slot 19 is formed between adjacent teeth 15 and 15. The stator 1 as described above is formed by disposing the coils 20 in the slots 19.

Figure 3:
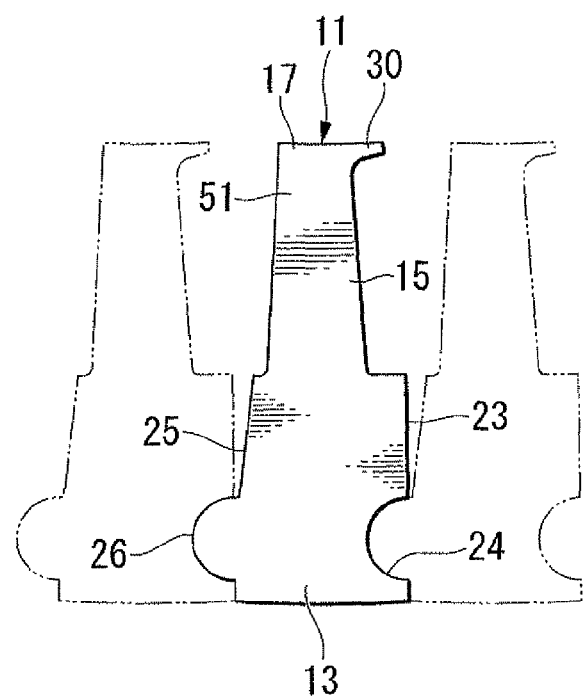
FIG. 3 is a plan view showing core pieces of the first embodiment of the present invention.

FIG. 3 is a plan view of a core piece 11.

As shown in FIG. 3, the core piece 11 is configured by laminating flat steel plates 51 that form the yoke 13, the teeth 15, and the distal end portion 17. The flat steel plates 51 configuring the core piece 11 can be simply manufactured by press forming. One tooth 15 is formed on one core piece 11. In other words, a core piece 11 is divided on each tooth 15.

A first side portion 23 and a second side portion 25, disposed opposite the first side portion 23, are provided on both peripheral sides (both side portions between the outer-peripheral portion and the inner-peripheral portion) of the yoke 13. A depressed portion 24 is formed on the first side portion 23 and a protruding portion 26 is formed on the second side portion 25. In the plurality of core pieces 11 that are arrayed in the arrangement as shown in FIGS. 2 and 3, core pieces (first core piece and second core piece) that are adjacent to each other are connected. The depressed portion 24 provided in the first side portion 23 of the first yoke of the first core piece is engaged with the protruding portion 26 provided on the second side portion 25 of the second yoke of the second core piece.

When arranging the adjacent core pieces 11 into a band shape, the depressed portion 24 and the protruding portion 26 are slightly separated from each other. When forming the plurality of core pieces 11 from the band shape into a cylindrical shape, the depressed portion 24 and the protruding portion 26 are mutually engaged.

In the first embodiment, a claw portion 30 is only formed on one side portion of the two side portions that form the distal end portion 17 of the teeth 15. The claw portion 30 protrudes in a peripheral direction when the plurality of core pieces 11 is connected in an annular shape.

In other words, the claw portion 30 is formed so as to protrude in a direction which is substantially orthogonal to the direction of extension of the teeth 15.

The claw portion 30 (claw portion 30 of the first core piece) is in close proximity to the distal end portion 17 of the adjacent core piece (second core piece) when the plurality of core pieces 11 is connected in an annular shape. The length of the claw portion 30 is set so that a slight space is formed between the claw portion 30 and the distal end portion 17 when the plurality of core pieces 11 is connected in an annular shape.

Next, the order of forming the stator 1 by connecting a plurality of core pieces 11 will be described.

Figure 4:
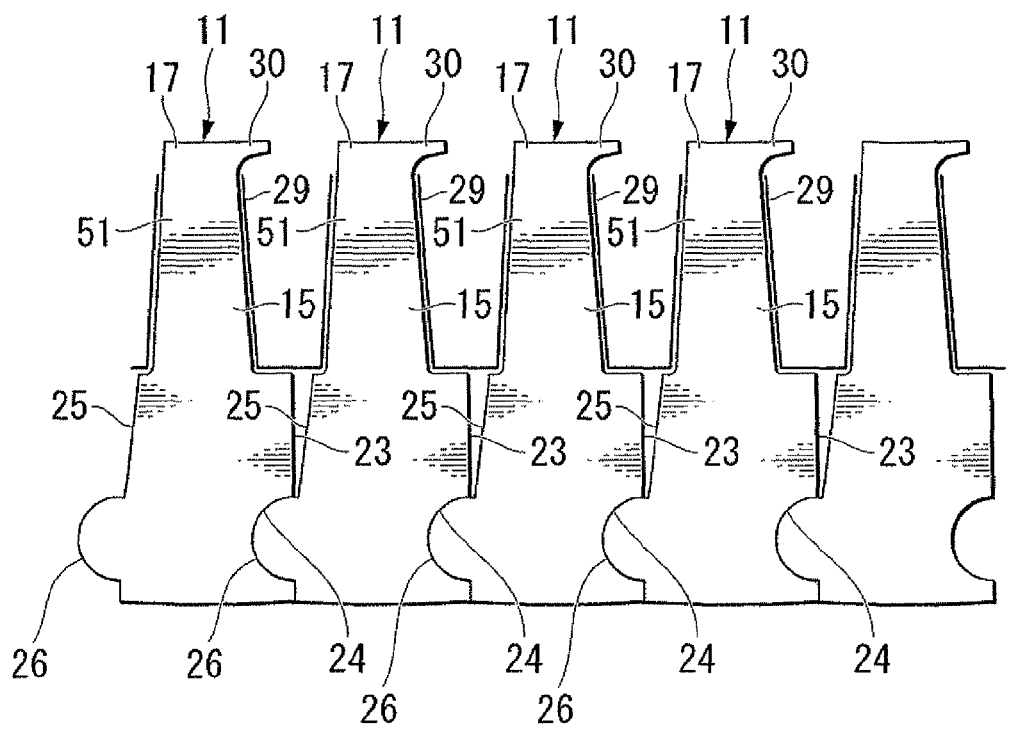
FIG. 4 is a plan view partially showing the core pieces arrayed in a band orientation in the first embodiment of the present invention.

FIG. 4 is a partial plan view of core pieces arranged in a band shape.

As shown in FIG. 4, a plurality of flat steel plates 51 are laminated and joined to thereby form a core piece 11 having a desired thickness.

A plurality of core pieces 11 is prepared and the plurality of core pieces is arranged in a band shape in the same direction.

Then, the plurality of core pieces 11 is disposed in a band shape so that the protruding portion 26 and the depressed portion 24 of mutually adjacent core pieces 11 are substantially engaged.

Figure 5:
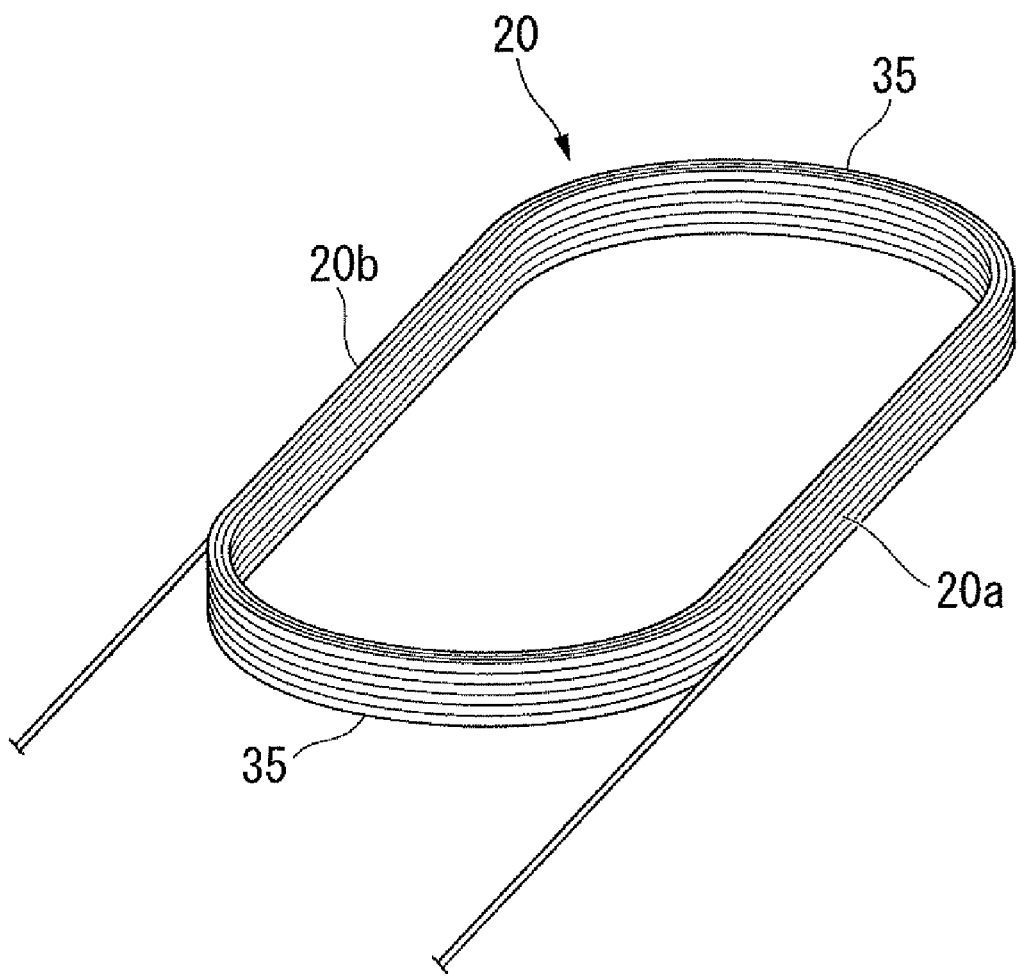
FIG. 5 is a perspective view showing a structure of a coil in the first embodiment of the present invention.

After completely connecting the core pieces 11, insulating paper 29 is disposed along the side face of the slot 19 (side face of the teeth 15). After disposing the insulating paper 29, the coils 20 are disposed in the slots 19. More specifically, as shown in FIG. 5, a plurality of ring-shaped coils 20 is formed using a coiling apparatus (not shown). Both end portions of the lead line configuring the coils 20 extend from the ring. Both end portions of the lead line are connected to a power source terminal or the ground terminal. In the first embodiment, the number of coils 20 that are manufactured is 24.

FIGS. 6A to 6C illustrate a method for inserting a coil into a slot portion.

As shown in FIGS. 6A to 6C, the coil 20 forms three phases being the U phase, the V phase, and the W phase. In the first embodiment, 48 core pieces 11 are used to form the stator core 10. In other words, slots 19 are formed at 48 positions.

The coil 20U (first coil) that forms the U phase is formed by 8 ring-shaped coils 20 (rings U1 to U8). In the same manner, the coil 20V (second coil) that forms the V phase is formed by 8 rings V1 to V8. The coil 20W (third coil) that forms the W phase is formed by 8 rings W1 to W8.

These rings are formed with a size enabling insertion into two slots 19 which are spaced at a predetermined interval. After manufacturing the coil 20, the coil 20 is inserted into the slot 19 of the stator core 10.

More specifically, as shown in FIG. 6A, the ring U1 is inserted into the slot 19 of slot number 1 and slot number 6 in the U-phase coil 20U. The ring U2 is inserted into the slot 19 of slot number 7 and slot number 12. This process is repeated by inserting the ring U8 into the slot 19 of slot number 43 and slot number 48.

Furthermore, as shown in FIG. 6B, the ring V1 is inserted into the slot 19 of slot number 45 and slot number 2 in the V-phase coil 20V. The ring V2 is inserted into the slot 19 of slot number 3 and slot number 8. In the same manner, a ring V8 is inserted into the slot 19 of slot number 39 and slot number 44.

Furthermore, as shown in FIG. 6C, the ring W1 is inserted into the slot 19 of slot number 47 and slot number 4 in the W-phase coil 20W. The ring W2 is inserted into the slot 19 of slot number 5 and slot number 10. In the same manner, the ring W8 is inserted into the slot 19 of slot number 41 and slot number 46.

The order of inserting the coils 20 into the slots 19 will be described below.

In the following description, only the slot number will be described in relation to the slot 19.

Figure 7:
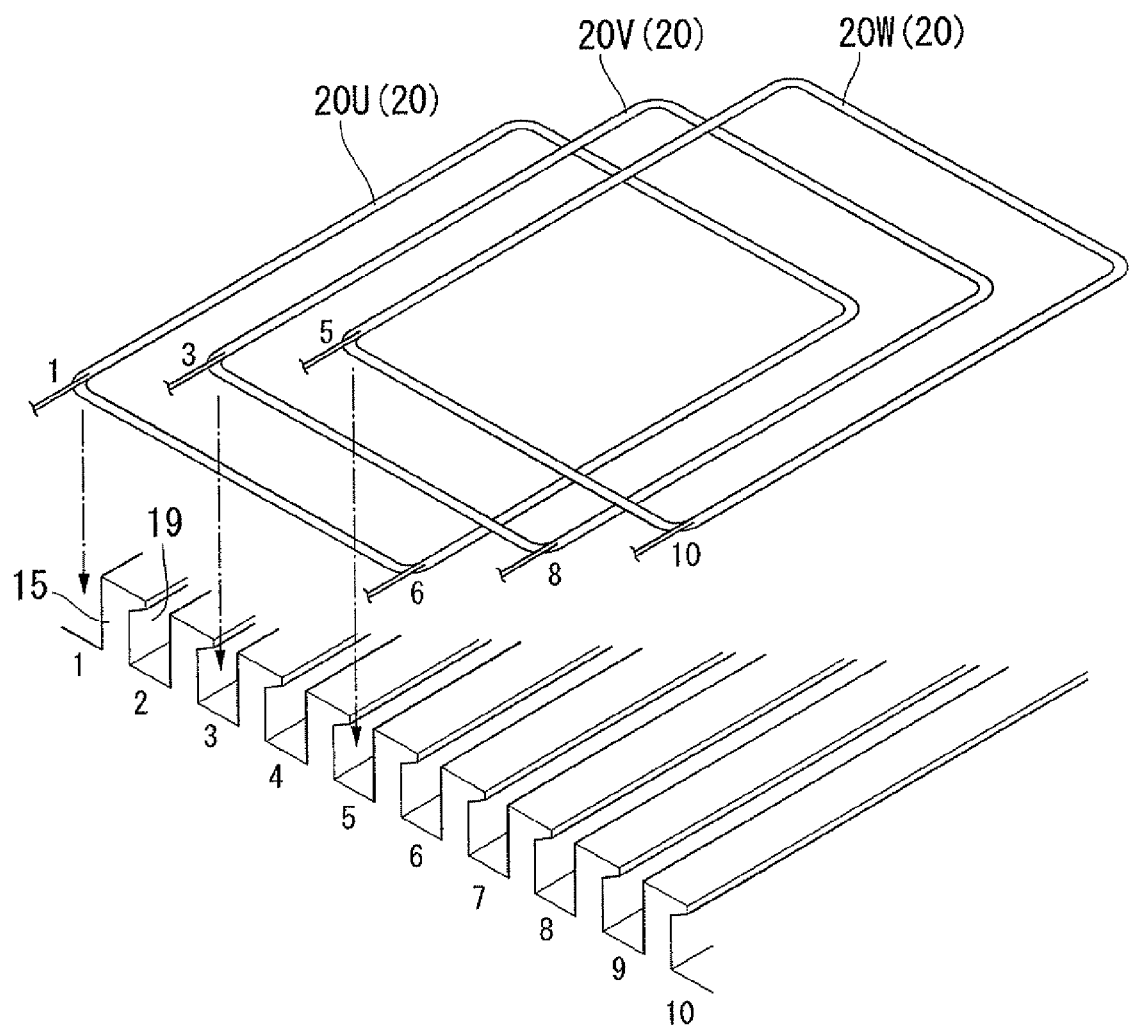
FIG. 7 is a perspective view showing an arrangement state of the coils in the first embodiment of the present invention.
Figure 8:
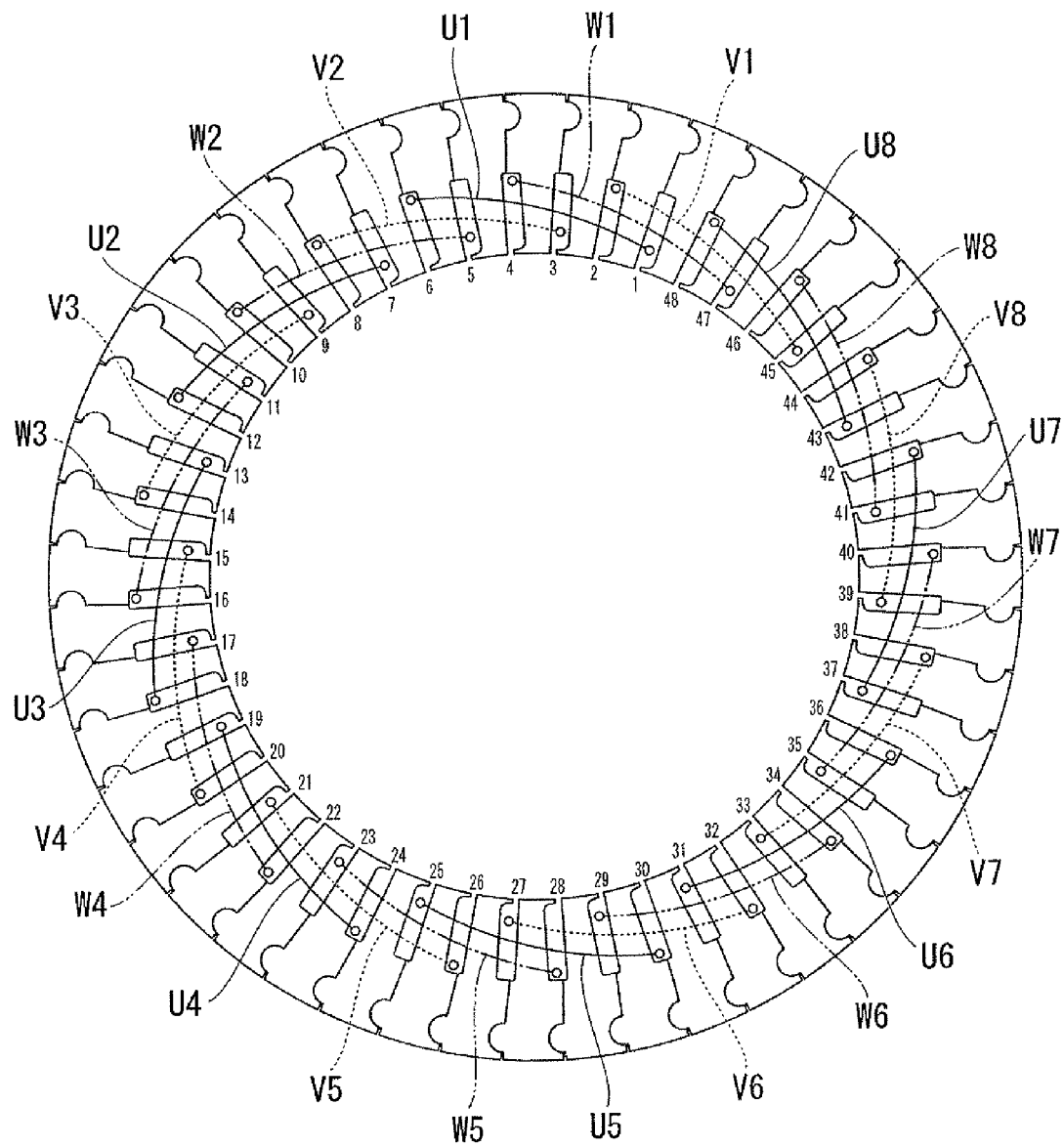
FIG. 8 is a schematic plan view showing the core pieces arrayed in a cylindrical shape in the first embodiment of the present invention.

FIG. 7 is a perspective view showing the arrangement the coils. FIG. 8 is a plan view showing a core piece disposed in a cylindrical shape.

In the first embodiment, prior to disposing the plurality of core pieces into a cylindrical shape, the coil is inserted into the band-shaped core piece. The following description will make reference to FIG. 8 which illustrates the plurality of core pieces arranged into a cylindrical shape.

As shown in FIGS. 7 and 8, the first portion of the ring V1 of the coil 20V that forms the V phase is inserted into the slot number 2. At this time, the second portion of the ring V1 (the position indicated by reference numeral A in FIG. 6B) is not inserted into the slot number 45.

Next, the first portion of the ring W1 of the coil 20W that forms the W phase is inserted into the slot number 4. At this time, the second portion of the ring W1 (the position indicated by reference numeral B in FIG. 6C) is not inserted into the slot number 47.

Next, the first portion of the ring U1 of the coil 20U that forms the U phase is inserted into the slot number 6. At this time, the second portion of the ring U1 is provisionally inserted into the slot number 1.

Next, the ring V2 of the coil 20V that forms the V phase is inserted to bridge the slot number 3 and the slot number 8.

With respect to the ring V2, firstly, the first portion 20a is inserted into the slot number 8 (refer to FIG. 5), and then the second portion 20b which is positioned opposite the first portion 20a is inserted into the slot number 3 to thereby arrange the ring V2.

In the manner of insertion as described above, it is possible to smoothly insert the ring V2 into the slot without interference with the claw portion 30.

In the same manner, after inserting the ring W2 of the W-phase coil 20W to bridge the slot number 5 and the slot number 10, the ring U2 of the U-phase coil 20U is inserted to bridge the slot number 7 and the slot number 12.

This sequence is repeated so that V3→W3→U3→V4→ . . . →V8→W8→W3→U8 are inserted respectively into the slot 19.

When the coil 20 is inserted into the slot 19 in this manner, the coils 20U, 20V, and 20W are disposed so that the coil end portion 35U (first coil end portion), the coil end portion 35V (second coil end portion), and the coil end portion 35W (third coil end portion) that protrude to an outer side of the stator core 10 from both axial end faces of the stator core 10 mutually crossover.

The band-shaped core piece 11 is deformed into a cylindrical shape with a configuration in which the position of the ring V1 indicated by reference numeral A and the position of the ring W1 indicated by reference numeral B are not inserted into the slot 19. Furthermore, in the plurality of core pieces 11 arranged into a band shape, the core pieces 11 disposed on both ends are connected with each other, and the plurality of core pieces 11 are thereby arranged into a cylindrical shape as shown in FIG. 8.

Then, if required, after removing the ring U1 which was provisionally inserted into the slot number 1, the ring V1 of the V-phase coil 20V that is not inserted into the slot 19 (the position indicated by reference numeral A in FIG. 6B) is inserted into the slot number 45.

Thereafter, the ring W1 of the W-phase coil 20W (the position indicated by reference numeral B in FIG. 6C) is inserted into the slot number 47. When the coils 20 are inserted into all the slots 19, the stator 1 is inserted into a housing (not shown).

After adjusting the lead line so that there is no looseness in each coil 20U, 20V, and 20W inserted into the slot 19, the lead line that extends from both end portions of each coil 20U, 20V, and 20W is connected to the U phase, the V phase, and the W phase power terminals and the ground terminal.

The method of inserting the coil 20 into the slot 19 will now be described in further detail.

Although a method of inserting the ring U1 into the slot 19 will be described, the same method is used for insertion into the other rings V1 and W1.

Figure 9:
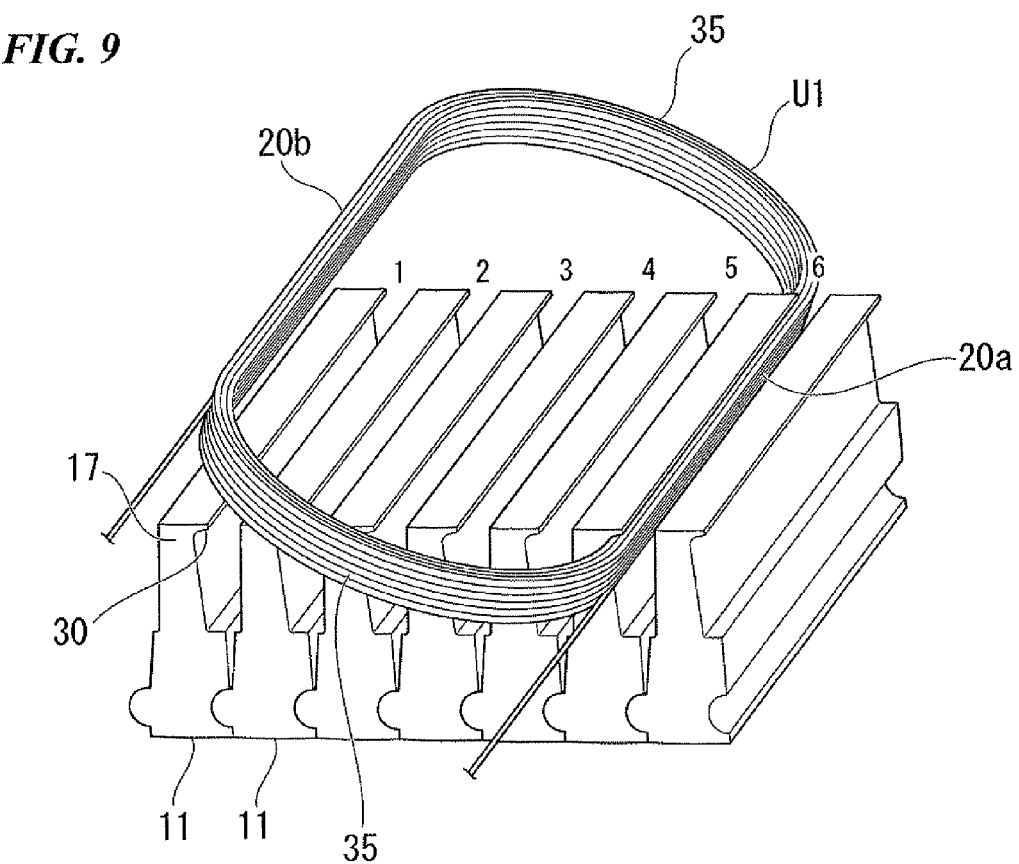
FIG. 9 is an explanatory diagram illustrating a method for attaching the core pieces on the coil in the first embodiment of the present invention.

As shown in FIG. 9, the claw portion 30 is formed on only one side portion of the two side portions that form the distal end portion 17 of the core piece 11.

When inserting the ring U1, firstly, the first portion 20a of the ring U1 is inserted into the slot number 6 (first slot portion).

Figure 10:
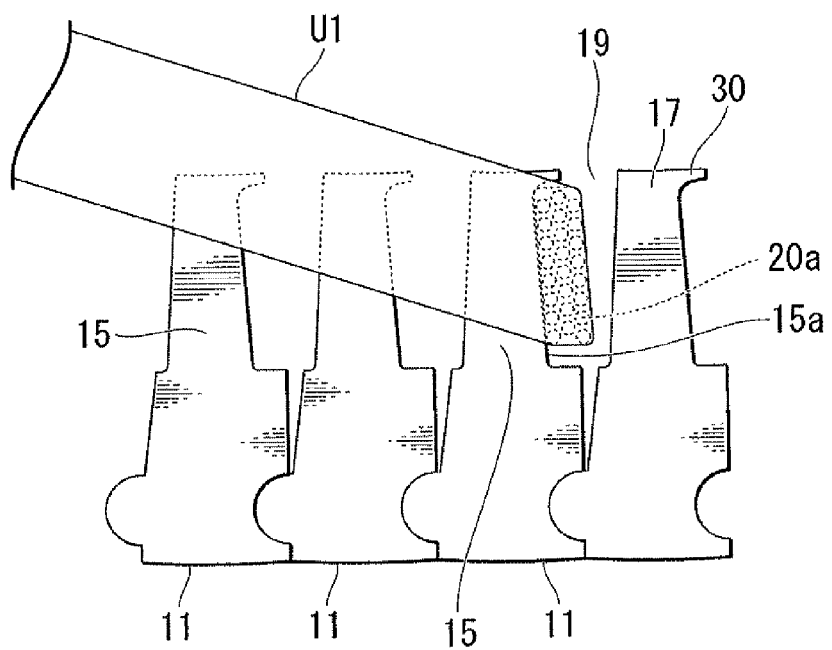
FIG. 10 is an explanatory diagram illustrating a method for attaching the core pieces on the coil in the first embodiment of the present invention.

Next, as shown in FIG. 10, the first portion 20a of the ring U1 is in contact with the side face 15a (the side face of the teeth 15) which is proximate to the position at which the slot number 1 is disposed in the slot 19. In other words, the first portion 20a is in contact with the face of the side portion that forms the claw portion 30 of the two side portions that form the distal end portion 17.

Next, as shown in FIG. 11, the second portion 20b of the ring U1 is inserted into the slot number 1 (second slot portion).

The size of the ring U1 is set so that, in the slot 19, the ring U1 slightly avoids from being contacted with the side portion on which the claw portion 30 is not formed and which is one of the two side portions that form the distal end portion 17, and the ring U1 slightly avoids from being contacted with the distal corner positioned with the upper portion of the distal end portion 17.

This configuration enables shortening of the length of the coil end portion 35 of the coil 20.

That is, as shown in FIG. 12A, the conventional structure is configured so that the claw portion 30 protrudes on both sides of the distal end portion 17 of the teeth 15. In contrast, as shown in FIG. 12B, in the first embodiment, the claw portion 30 is formed on only one of the side portions. Therefore, the length of the coil end portion 35 of the coils 20 can be shortened by a distance d.

Figure 13:
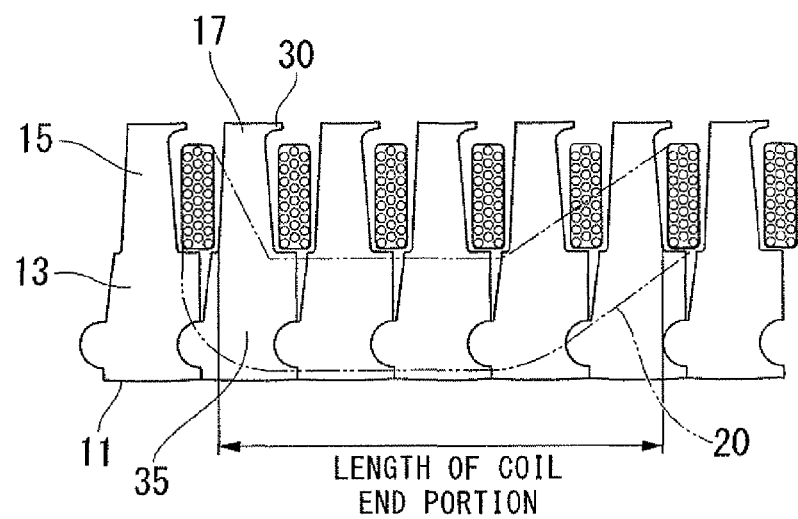
FIG. 13 is an explanatory diagram illustrating a coil end portion of the coil in the first embodiment of the present invention.

As shown in FIG. 13, the length of the coil end portion 35 of the coils 20 indicates the length of the coils 20 protruding from the end face of the stator core 10 in one coil 20 towards the outer side of the stator core 10.

Furthermore, since the coil end portion 35 of the coil 20 is disposed to crossover with the other coil 20, the coil end portion 35 is arranged to mainly pass over the yoke 13 of the stator core 10.

In this manner, high torque density performance can be maintained by using distributed winding to mount a coil 20 that has an overall length which is shorter than the conventional structure on the stator core 10 and therefore the stator 1 for a high-performance motor can be manufactured.

Since cylindrical coils 20 having a size which corresponds to the slot 19 are formed by winding a lead line in advance, mounting of the coil 20 can be executed by merely inserting the ring-shaped coil 20 into the slot 19.

Thus, productivity can be improved in comparison to forming a coil while winding a lead line onto the slot 19 after preparing a core piece 11.

The first embodiment is configured so that all the coils 20 (20U, 20V, and 20W) which configure the U phase, the V phase, and the W phase which form a rotating magnetic field for the motor have the same shape. When manufacturing a three-phase motor having a U phase, V phase, and W phase, the coils 20 (20U, 20V, and 20W) which correspond to each phase can be manufactured using the same process. Therefore, productivity can be improved.

According to the first embodiment, since the coils 20 are disposed so that a plurality of core pieces 11 are arranged in a band shape, the coils 20 can be disposed densely into the slots 19 and therefore the space factor of the coils 20 can be improved.

When inserting the second portion 20b of the cylindrical coils 20 into the slot 19, the second portion 20b is disposed in the slot 19 so that the second portion 20b passes the corner (distal end corner portion) on which a claw portion 30 is not formed on a distal end of the teeth 15. As a result, it is possible to shorten the overall length of the coil 20 (reduce the annular diameter).

Thus, resistance produced by the coil 20 can be reduced and it is possible to substantially suppress the height of the coil end portion 35 of the coil 20 that protrudes from both axial end faces of the stator core 10 towards an outer side of the stator core 10.

Since a slot 19 with a sufficient size can be ensured by disposing a plurality of core pieces 11 in a band shape, insertion of the coil 20 can be facilitated into the slot 19.

Thus, an effect is obtained in which the production efficiency of the stator 1 can be improved.

When inserting the second portion 20b of the ring-shaped coil 20 into the slot 19, the second portion 20b is inserted into the slot 19 while the first portion 20a of the coil 20 being in contact with the side portion (side face) which forms the claw portion 30. The side portion is one of the two side portions that form the distal end portion 17 of the teeth 15. In this manner, the overall length of the coil 20 can be reduced (reduction in annular diameter).

In the first embodiment, the coils 20U, 20V, and 20W are disposed so that the coil end portions 35U, 35V, and 35W of the coils 20U, 20V, and 20W which form the three phases mutually crossover. Thus, it is possible to substantially suppress the height of the coil end portions 35U, 35V, and 35W protruding from both axial end faces of the stator core 10 towards an outer side of the stator core 10. Thus it is possible to downsize the motor.

Modified Example of the First Embodiment

Figure 14:
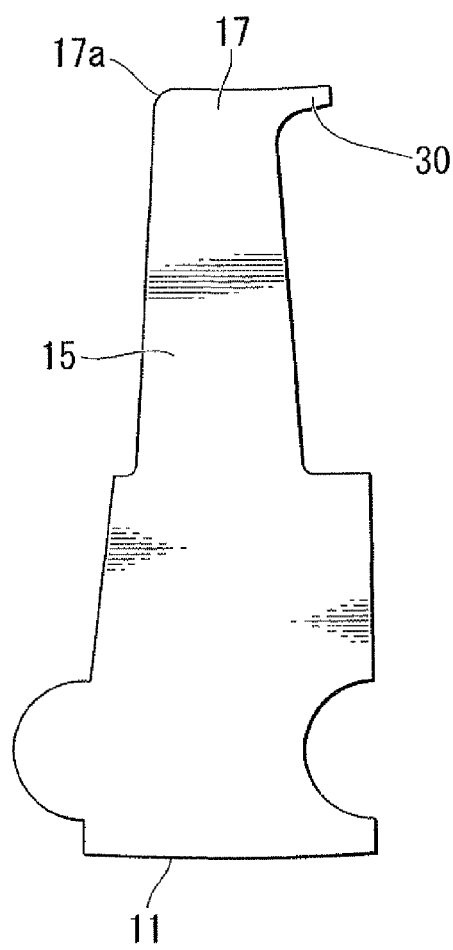
FIG. 14 is a plan view partially showing a modified example of a distal end of a teeth portion in the first embodiment of the present invention.
Figure 15:
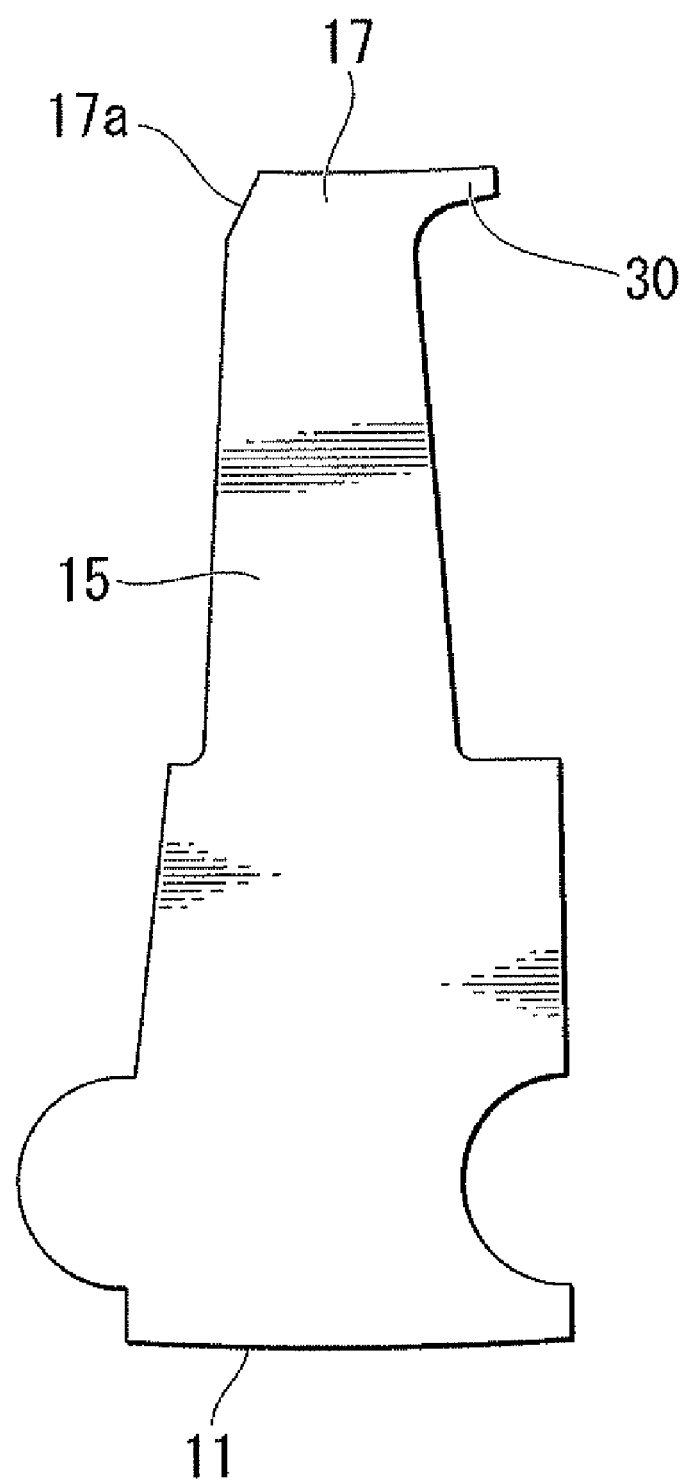
FIG. 15 is a plan view partially showing a modified example of a distal end of a teeth portion in the first embodiment of the present invention.

As a modified example of the first embodiment, a corner portion 17*a* may be formed between the side portion on which the claw portion 30 is not formed of the two side portions forming the distal end portion 17 of the core piece 11 and the distal end corner portion positioned at the upper portion of the distal end portion 17. For example, as shown in FIG. 14, the corner portion 17*a* may have a curved shape. Furthermore, as shown in FIG. 15, the face of the corner portion 17*a* may be chamfered. Formation of the corner portion 17*a* in this manner enables effective prevention of damage to the coil 20 when inserting the coils 20 into the slot 19.

Figure 16:
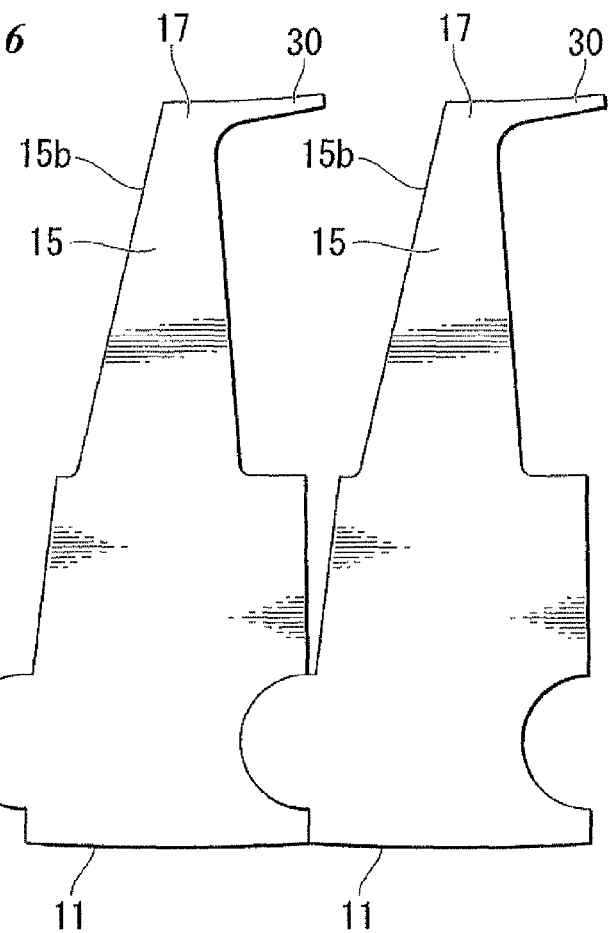
FIG. 16 is a plan view showing a modified example of a teeth portion in the first embodiment of the present invention.

Furthermore, as shown in FIG. 16, in the teeth 15 of the core piece 11 according to the first embodiment, an inclined face may be formed on the side portion 15*b* (side face) on which the claw portion 30 is not formed of the two side portions that form the distal end portion 17. On the inclined face, the width of the teeth 15 decreases in a direction from a radial-outer side toward radial-inner side of the stator 1 shown in FIG. 1.

When the plurality of core pieces 11 is connected in an annular shape, the length of the claw portion 30 is set so that the space between the mutually adjacent distal end portions 17 and 17 does not increase. In other words, the length of the claw portion 30 is set so that a slight space is formed between the claw portion 30 and the distal end portion 17.

This configuration enables the overall length of the coil 20 to be more effectively shortened.

Furthermore, the coils 20 can be smoothly inserted into the slots 19, and when inserting the coils 20 into the slots 19, damage to the coating of the coils 20 resulting from contact between the coils 20 and the corner portion of the teeth 15 can be prevented.

Second Embodiment

Next, a second embodiment of the present invention will be described making reference to FIGS. 17 to 19.

The second embodiment differs from the first embodiment only with respect to the configuration of the core piece, and other configurations are substantially similar to the first embodiment. As a result, the same reference numerals denote the same members and detailed description will not be repeated.

Figure 17:
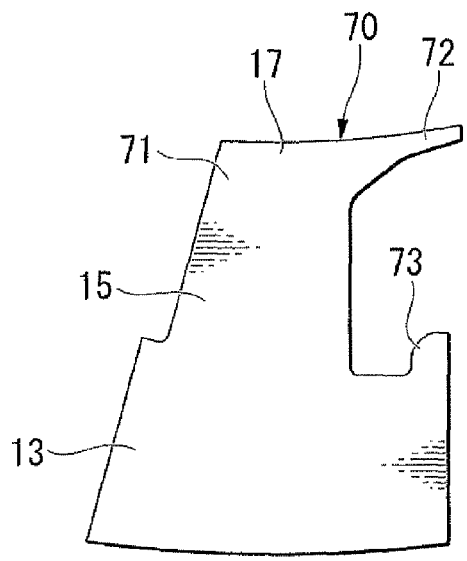
FIG. 17 is a plan view showing a core piece of a second embodiment of the present invention.

FIG. 17 is a plan view of a core piece 70.

As shown in FIG. 17, the core piece 70 is configured by laminating a plurality of flat steel plates 51 that form the yoke 13, the teeth 15, and the distal end portion 17. One tooth 15 is formed on one core piece 70. That is, a core piece 70 is divided on each tooth 15. The flat steel plates 71 configuring the core piece 70 can be simply manufactured by press forming.

In the second embodiment, a claw portion 72 is formed only the side portion of the two side portions that form the distal end portion 17 of the teeth 15. The claw portion 72 protrudes in a peripheral direction when the plurality of core pieces 70 is connected in an annular shape.

That is, the claw portion 72 is formed to protrude in a direction which is substantially orthogonal to the direction of extension of the teeth 15. The claw portion 72 (the claw portion 72 of the first core piece) is in close proximity to the distal end portion 17 of the adjacent core piece (second core piece) when the plurality of core pieces 70 is connected in an annular shape. Furthermore, the length of the claw portion 72 is set so that a slight space is formed between the claw portion 72 and the distal end portion 17 when the plurality of core pieces 70 is connected in an annular shape.

Figure 18:
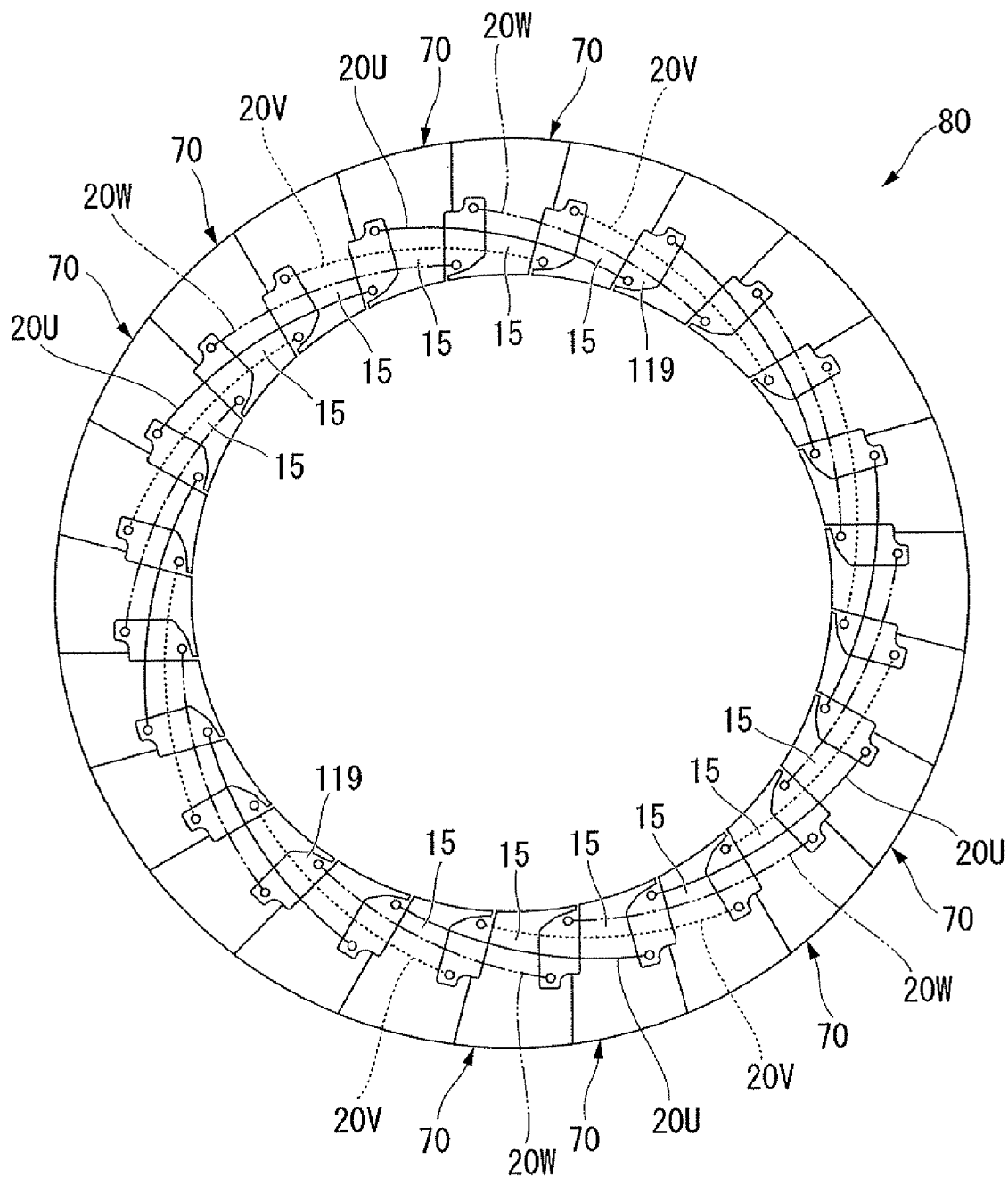
FIG. 18 is a schematic plan view showing the core pieces arrayed in a cylindrical shape in the second embodiment of the present invention.
Figure 19:
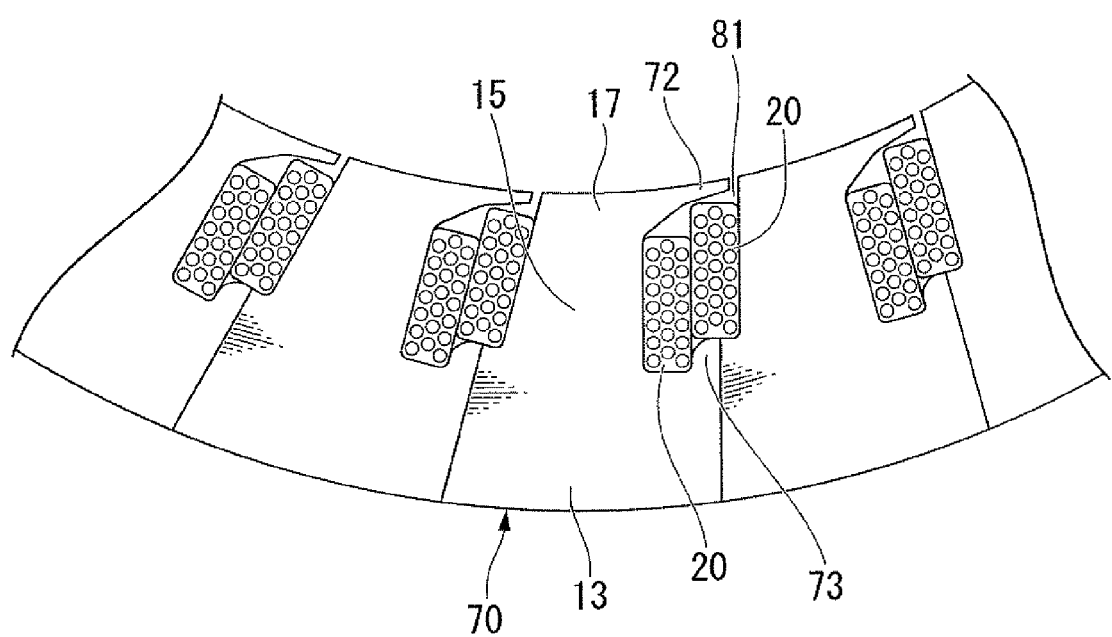
FIG. 19 is a plan view partially showing the core pieces arrayed in a cylindrical shape in the second embodiment of the present invention.

As shown in FIGS. 18 and 19, when the plurality of core pieces 70 are connected in an annular shape, a slot 81 is formed between adjacent teeth 15 and 15 on the stator 80 according to the second embodiment.

The slot 81 has a size enabling two groups of coils 20 of the same phase to be fitted therein.

In other words, this configuration enables a configuration of the stator 80 with a plurality of core pieces (24 core pieces in the second embodiment) which is half the number of components for example when compared with the stator core 10 according to the first embodiment.

A step portion 73 is formed on an inner-peripheral side of the yoke 13 in close proximity with the side portion that forms the claw portion 72 of the two side portions that form the distal end portion 17 of the teeth 15.

The step portion 73 is formed so that an end positioned on an outer-peripheral side with respect to the teeth 15 protrudes towards the radial inner side.

By forming the step portion 73 as described above, the position of one coil of the two groups of coils 20 and 20 disposed in the slot 81 is shifted from the position of the other coil 20 in a radial direction. The maintenance of this positional relationship supports the coils 20 in the slot 81.

In a substantially similar manner to the first embodiment, the second embodiment also disposes a coil 20 in a state in which the plurality of core pieces 70 is disposed in a band shape. As a result, a plurality of coils 20 can be densely arranged in the slot 81 and the space factor of the coils 20 can be improved.

Furthermore, when inserting the second portion 20*b* of the ring-shaped coils 20 into the slot 81, the second portion 20*b* is arranged in the slot 81 so that the second portion 20*b* passes the corner (distal end corner portion) on which a claw portion 72 is not formed on a distal end of the teeth 15. As a result, it is possible to shorten the overall length of the coil 20 (reduce the annular diameter).

Thus, resistance produced by the coil 20 can be reduced and it is possible to substantially suppress the height of the coil end portion 35 of the coil 20 protruding from both axial end faces of the stator core 10 towards an outer side of the stator core 10.

Since a slot 81 of a sufficient size can be ensured by disposing a plurality of core pieces 70 in a band shape, insertion of the coil 20 can be facilitated into the slot 81.

Thus, an effect is obtained in which the production efficiency of the stator 80 can be improved.

Third Embodiment

The preferred embodiments of the present invention will be described below with reference to FIGS. 20 to 37.

Figure 20:
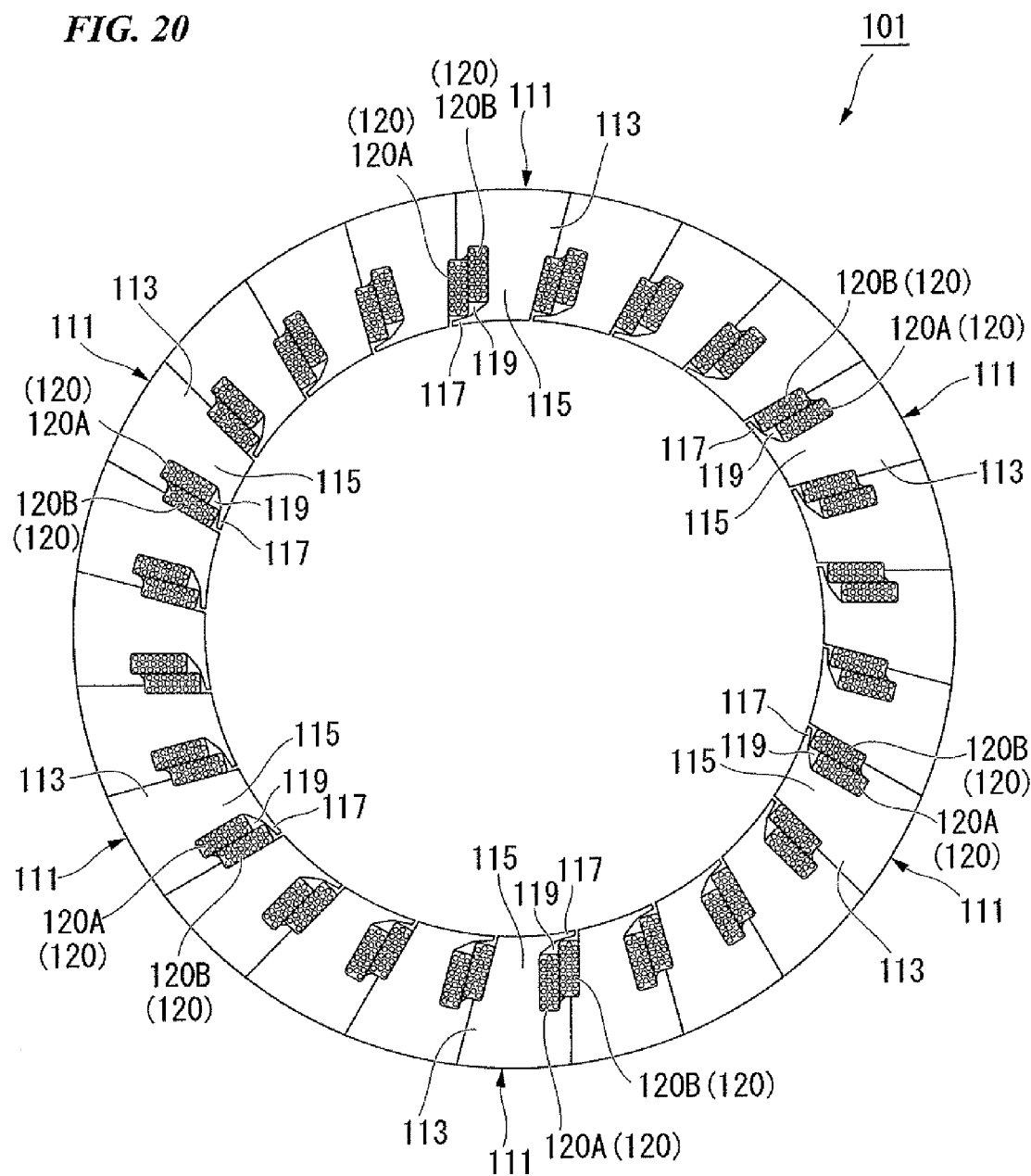
FIG. 20 is a plan view showing a stator of a third embodiment of the present invention.

FIG. 20 is a plan view of a stator.

In FIG. 20, a coil 120 is shown in cross section from an upper end of a stator core 110. As shown in FIG. 20, the stator 101 includes the stator core 110 formed in a cylindrical shape, a plurality of teeth 115 (teeth portions) adjacent to the stator core 110, slots 119 (slot portions) formed between the teeth 115 and 115, and coils 120 disposed on the slots 119.

A rotor (not shown) is rotatably disposed in a space formed in the center of the cylindrical stator 101.

Figure 21:
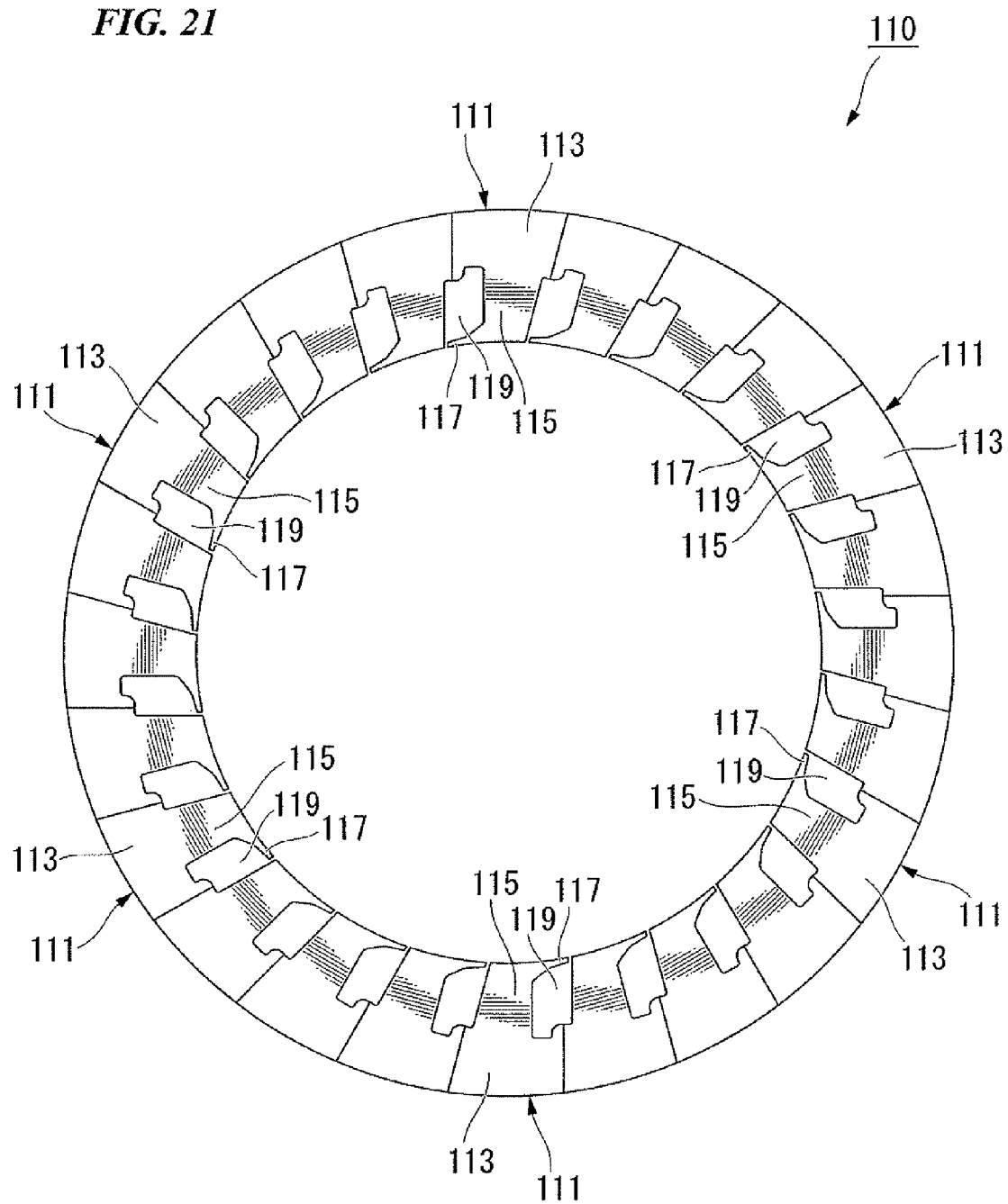
FIG. 21 is a plan view showing the stator core of the third embodiment of the present invention.

FIG. 21 is a plan view of a stator core.

As shown in FIG. 21, the stator core 110 is configured by connecting a plurality of core pieces 111 (stator core pieces) in a cylindrical shape. The stator core 110 includes a yoke 113 (yoke portion) configuring an outer-peripheral of the cylinder, teeth 115 that protrude from the yoke 113 towards the center of the cylinder, and a distal end portion 117 configuring a distal end of the teeth 115. A slot 119 is formed between adjacent teeth 115 and 115. The stator 101 as described above is formed by disposing the coils 120 in the slots 119.

Figure 22:
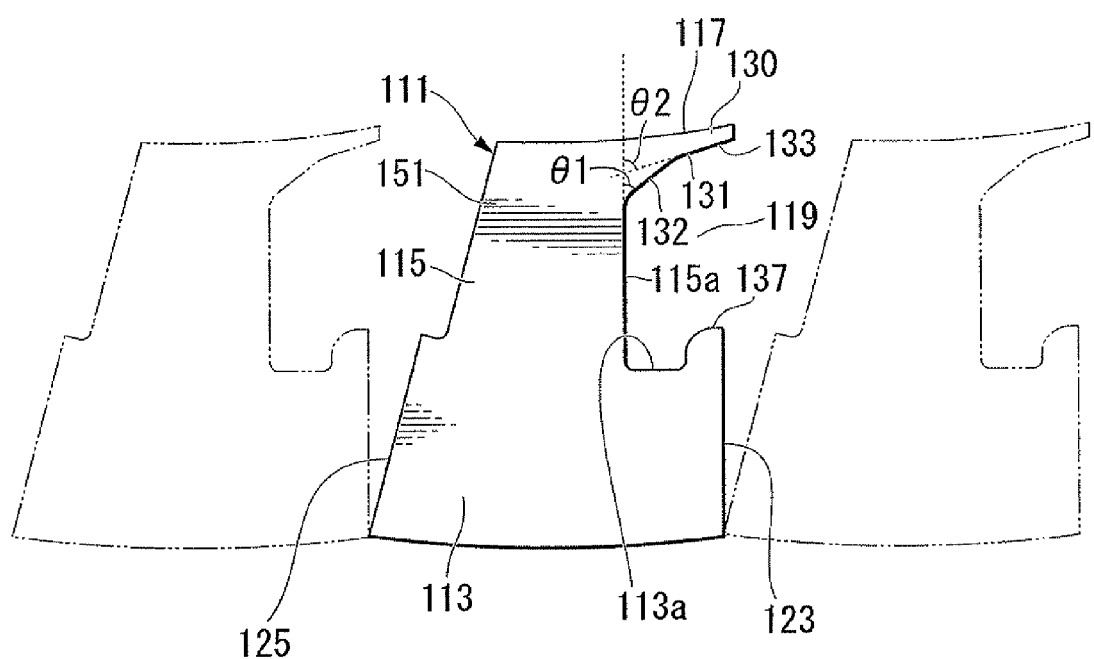
FIG. 22 is a plan view showing core pieces of the third embodiment of the present invention.

FIG. 22 is a plan view of a core piece 111.

As shown in FIG. 22, the core piece 111 is configured by laminating flat steel plates 151 that form the yoke 113, the teeth 115, and the distal end portion 117. The flat steel plates 151 configuring the core piece 111 can be simply manufactured by press forming. One tooth 115 is formed on one core piece 111. In other words, a core piece 111 is divided on each tooth 115.

A first side portion 123 and a second side portion 125, disposed opposite the first side portion 123, are provided on both peripheral sides of the yoke 113. Both peripheral sides of the yoke 113 are formed in a linear orientation so that the first side portion 123 is in contact with the second side portion 125. In the plurality of core pieces 111 that are arrayed in the arrangement as shown in FIGS. 21 and 22, core pieces (first core piece and second core piece) that are adjacent to each other are connected.

When arranging the adjacent core pieces 111 into a band shape, the first side portion 123 of the first core piece and the second side portion 125 of the second core piece are separated from each other. When forming the plurality of core pieces 111 from the band shape into a cylindrical shape, the first side portion 123 of the first core piece is in contact with the second side portion 125 of the second core piece.

In the third embodiment, a claw portion 130 is only formed on one side portion of the two side portions that form the distal end portion 117 of the teeth 115. The claw portion 130 protrudes in a peripheral direction when the plurality of core pieces 111 is connected in an annular shape.

In other words, the claw portion 130 is formed so as to protrude in a direction which is substantially orthogonal to the direction of extension of the teeth 115.

The claw portion 130 (claw portion 130 of the first core piece) is in close proximity to the distal end portion 117 of the adjacent core piece (second core piece) when the plurality of core pieces 111 is connected in an annular shape. The length of the claw portion 130 is set so that a slight space is formed between the claw portion 130 and the distal end portion 117 when the plurality of core pieces 111 is connected in an annular shape.

In addition, a side face 131 of the claw portion 130 facing the slot 119 has a first inclined face 132 and a second inclined face 133. The first inclined face 132 is formed so as to extend from the teeth 115 toward a tip of the claw portion 130. The second inclined face 133 is consecutively connected with the first inclined face 132, and is formed so as to extend toward the tip of the claw portion 130. Moreover, an angle θ1 between the first inclined face 132 and a side face 115a of the slot 119 is less than an angle θ2 between the second inclined face 133 and the side face 115a of the slot 119.

That is, the width of the claw portion 130 gradually increases in the direction from the tip of the claw portion 130 toward the teeth 115.

In addition, the slot 119 has a size that is capable of housing two pairs of coils 120 (two coils 120) having the same phase. Furthermore, a step portion 137 is formed on an inner-peripheral face 113a facing the slot 119 of the yoke 113. The step portion 137 is formed so that an end portion constituting a part of the first side portion 123 protrudes from the inner-peripheral face 113a of the yoke 113 in a radial-inner direction. By forming the step portion 137 as described manner, in two coils 120 disposed in the slot 119, the position of one coil 120A is shifted from the position of the other coil 120B in the radial-inner direction. In a state where the positional relationship as described above is maintained, the coils 120A and 120B are supported by the slot 119 (shown in FIG. 20).

Next, the order of forming the stator 101 by connecting a plurality of core pieces 111 will be described.

Figure 23:
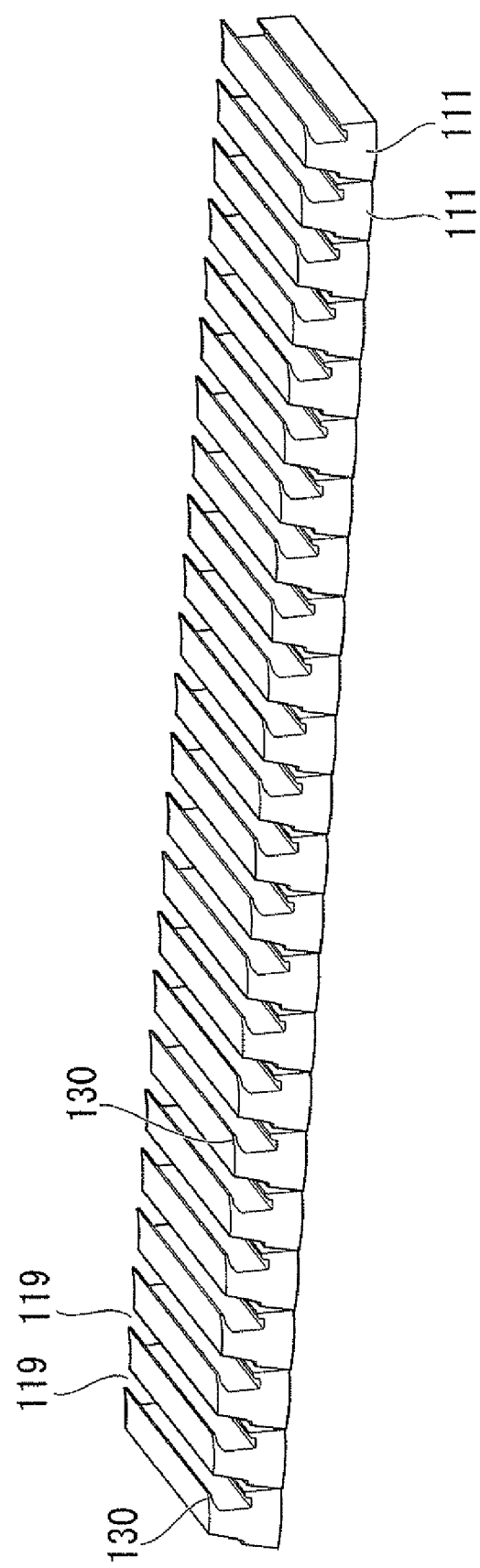
FIG. 23 is a perspective view showing the core pieces arrayed in a band orientation in the third embodiment of the present invention.

FIG. 23 is a perspective view of core pieces arranged in a band shape.

Figure 24:
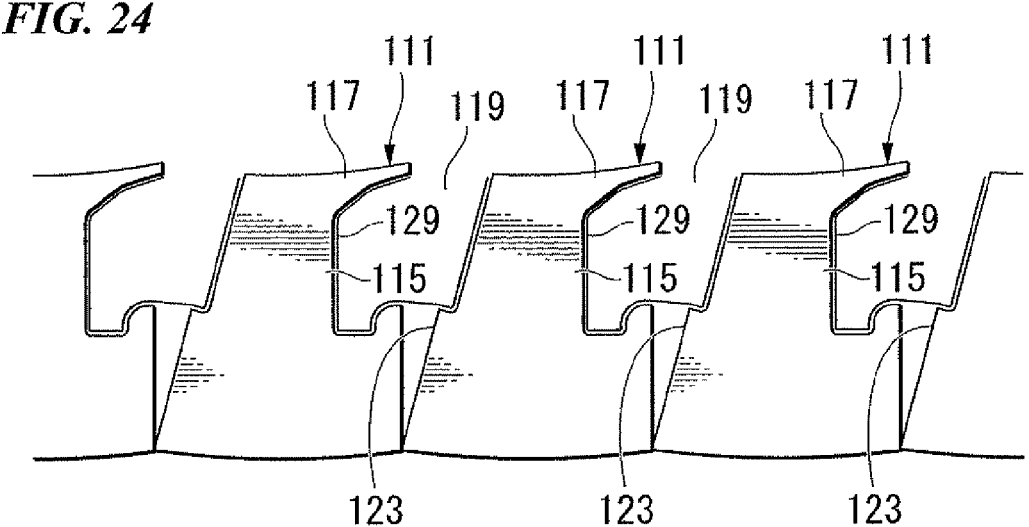
FIG. 24 is a plan view partially showing the core pieces arrayed in a band orientation in the third embodiment of the present invention.

FIG. 24 is a partial plan view of core pieces arranged in a band shape.

As shown in FIGS. 23 and 24, a plurality of flat steel plates 151 are laminated and joined to thereby form a core piece 111 having a desired thickness.

A plurality of core pieces 111 is prepared and the plurality of core pieces is arranged in a band shape in the same direction.

Figure 25:
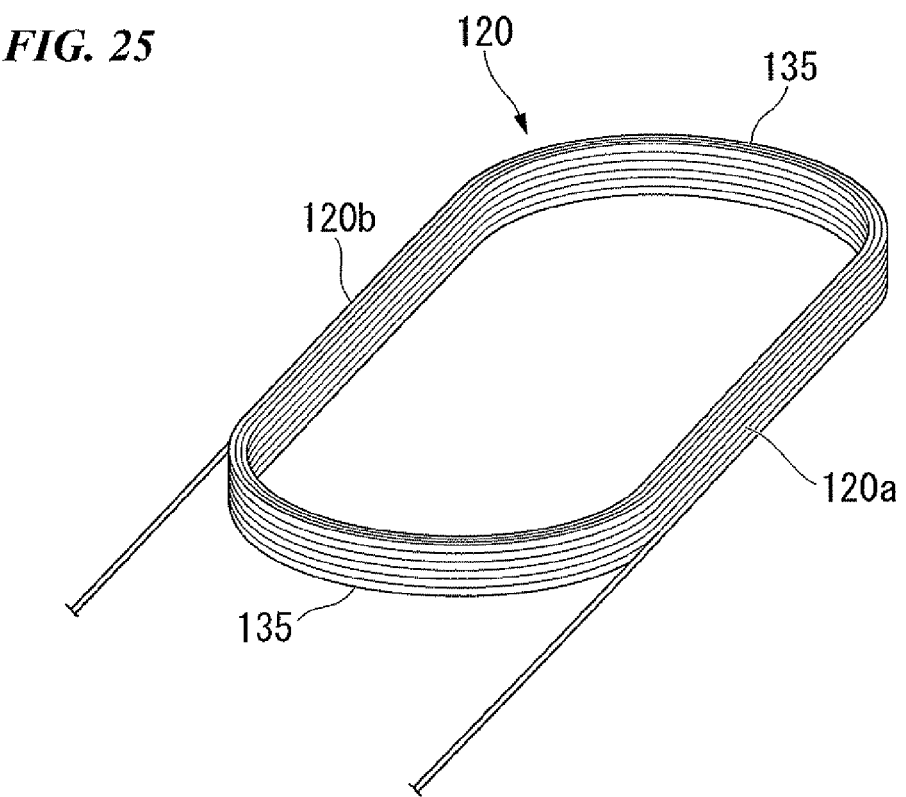
FIG. 25 is a perspective view showing a structure of a coil in the third embodiment of the present invention.

After completely connecting the core pieces 111, insulating paper 129 is disposed along the side face of the slot 119. After disposing the insulating paper 129, the coils 120 are disposed in the slots 119. More specifically, as shown in FIG. 25, a plurality of ring-shaped coils 120 is formed using a coiling apparatus (not shown). Both end portions of the lead line configuring the coils 120 extend from the ring. Both end portions of the lead line are connected to a power source terminal or the ground terminal. In the third embodiment, the number of coils 120 that are manufactured is 24.

Figure 26A:
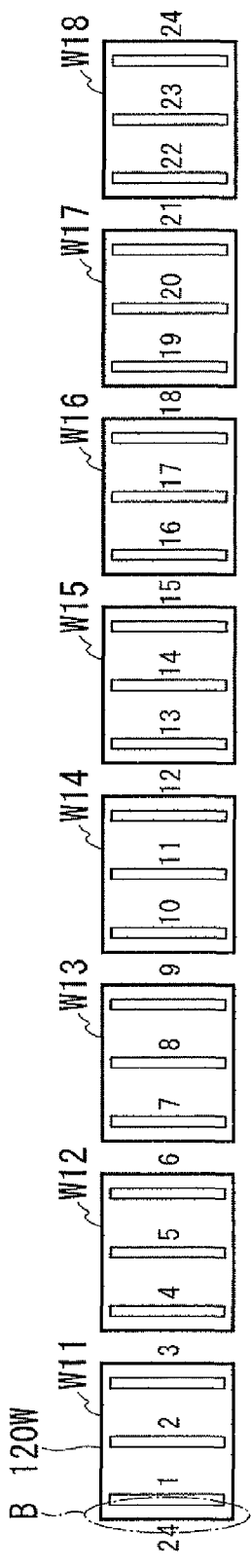
FIG. 26A is an explanatory diagram illustrating a method for inserting coils into slot portions in the third embodiment of the present invention.
Figure 26B:
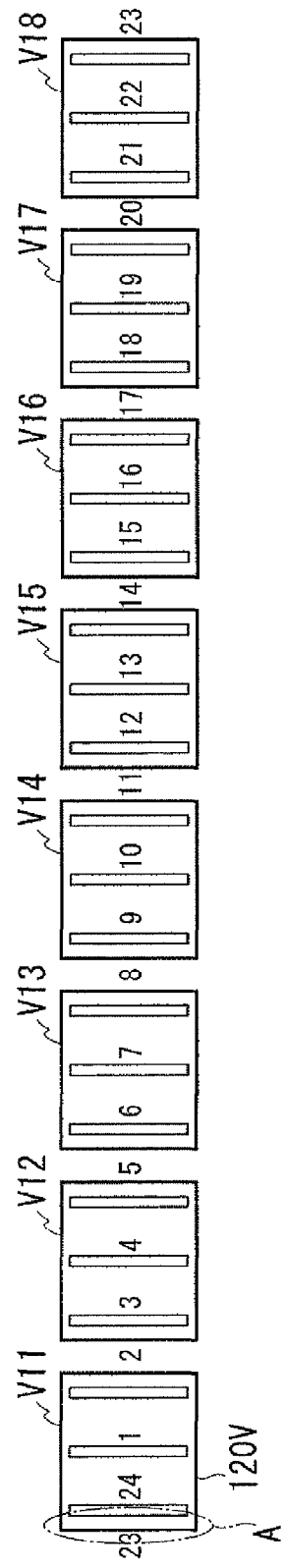
FIG. 26B is an explanatory diagram illustrating a method for inserting coils into slot portions in the third embodiment of the present invention.
Figure 26C:
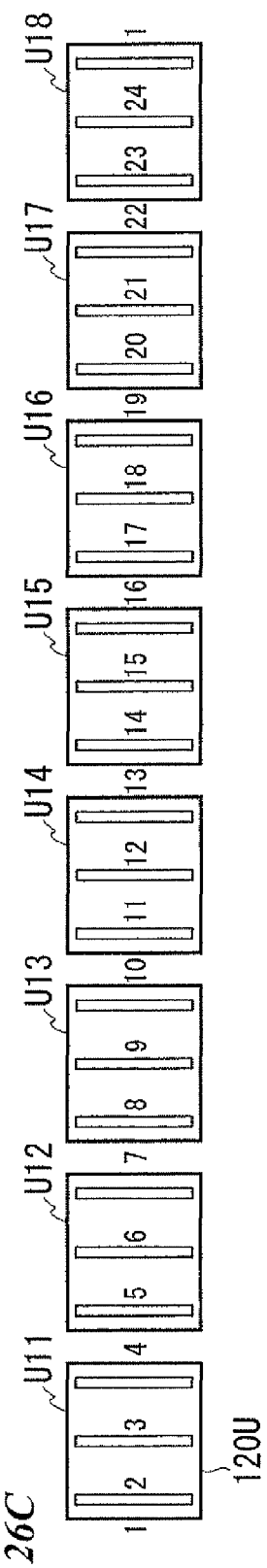
FIG. 26C is an explanatory diagram illustrating a method for inserting coils into slot portions in the third embodiment of the present invention.

FIGS. 26A to 26C illustrate a method for inserting a coil into a slot portion.

As shown in FIGS. 26A to 26C, the coil 120 forms three phases being the U phase, the V phase, and the W phase. In the third embodiment, 24 core pieces 111 are used to form the stator core 110. In other words, slots 119 are formed at 24 positions.

The coil 120U (first coil) that forms the U phase is formed by 8 ring-shaped coils 120 (rings U1f to U18). In the same manner, the coil 120V (second coil) that forms the V phase is formed by 8 rings V11 to V18. The coil 120W (third coil) that forms the W phase is formed by 8 rings W11 to W18.

These rings are formed with a size enabling insertion into two slots 119 which are spaced at a predetermined interval. After manufacturing the coil 120, the coil 120 is inserted into the slot 119 of the stator core 110.

More specifically, as shown in FIG. 26C, the ring U11 is inserted into the slot 119 of slot number 1 and slot number 4 in the U-phase coil 120U. The ring U12 is inserted into the slot 119 of slot number 4 and slot number 7. This process is repeated by inserting the ring U18 into the slot 119 of slot number 22 and slot number 1.

Furthermore, as shown in FIG. 26B, the ring V11 is inserted into the slot 119 of slot number 23 and slot number 2 in the V-phase coil 120V. The ring V12 is inserted into the slot 119 of slot number 2 and slot number 5. In the same manner, a ring V18 is inserted into the slot 119 of slot number 20 and slot number 23.

Furthermore, as shown in FIG. 23A, the ring W11 is inserted into the slot 119 of slot number 24 and slot number 3 in the W-phase coil 120W. The ring W12 is inserted into the slot 119 of slot number 3 and slot number 6. In the same manner, the ring W18 is inserted into the slot 119 of slot number 21 and slot number 24.

That is, two coils 120 having the same phase are inserted into each slot 119.

Figure 27:
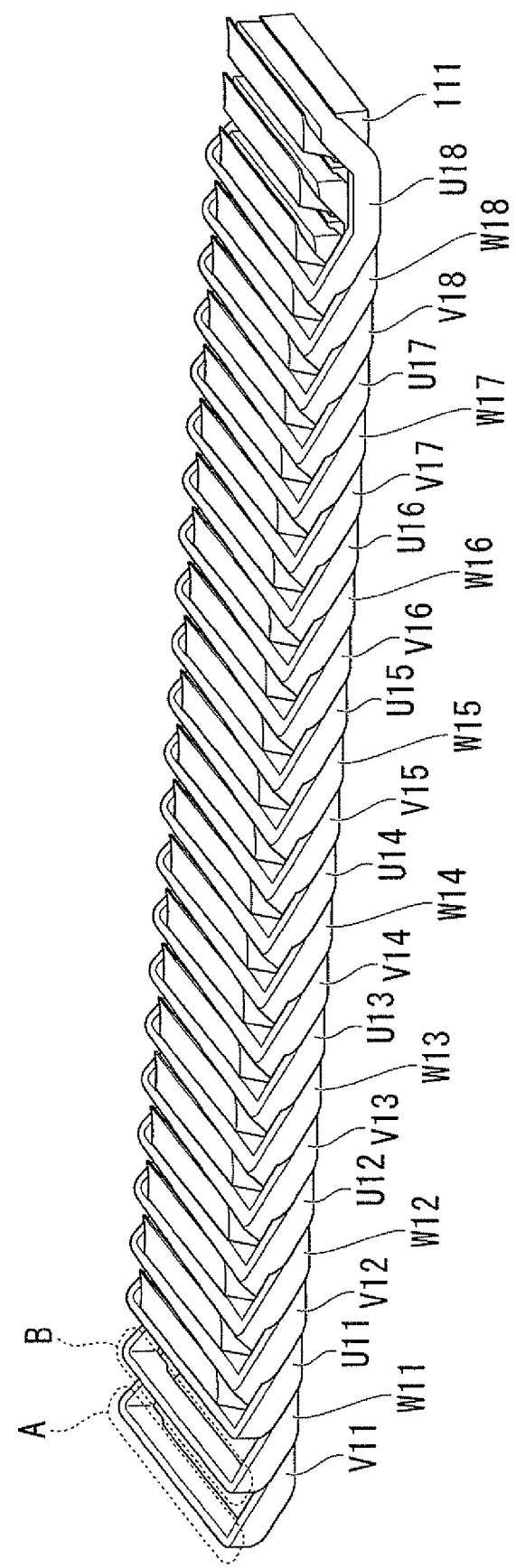
FIG. 27 is a perspective view showing a state where all of coils were inserted into slot portions in the third embodiment of the present invention.

FIG. 27 is a perspective view showing a state where the coils 120 are inserted into the plurality of core pieces 111 that are arrayed in a band orientation.

The ring V11 and ring W11 are disposed in desired slots 119 except for the first portion of the ring V11 (the position indicated by reference numeral A) and the first portion of the ring W11 (the position indicated by reference numeral B)

In this state, by deforming the plurality of core pieces 11 into an annular shape and by inserting the second portion of the ring V11 and the second portion of the ring W11 into desired slot 119, the stator 101 is completed (described below).

The order of inserting the coils 120 into the slots 119 will be described below.

In the following description, only the slot number will be described in relation to the slot 119.

Figure 28:
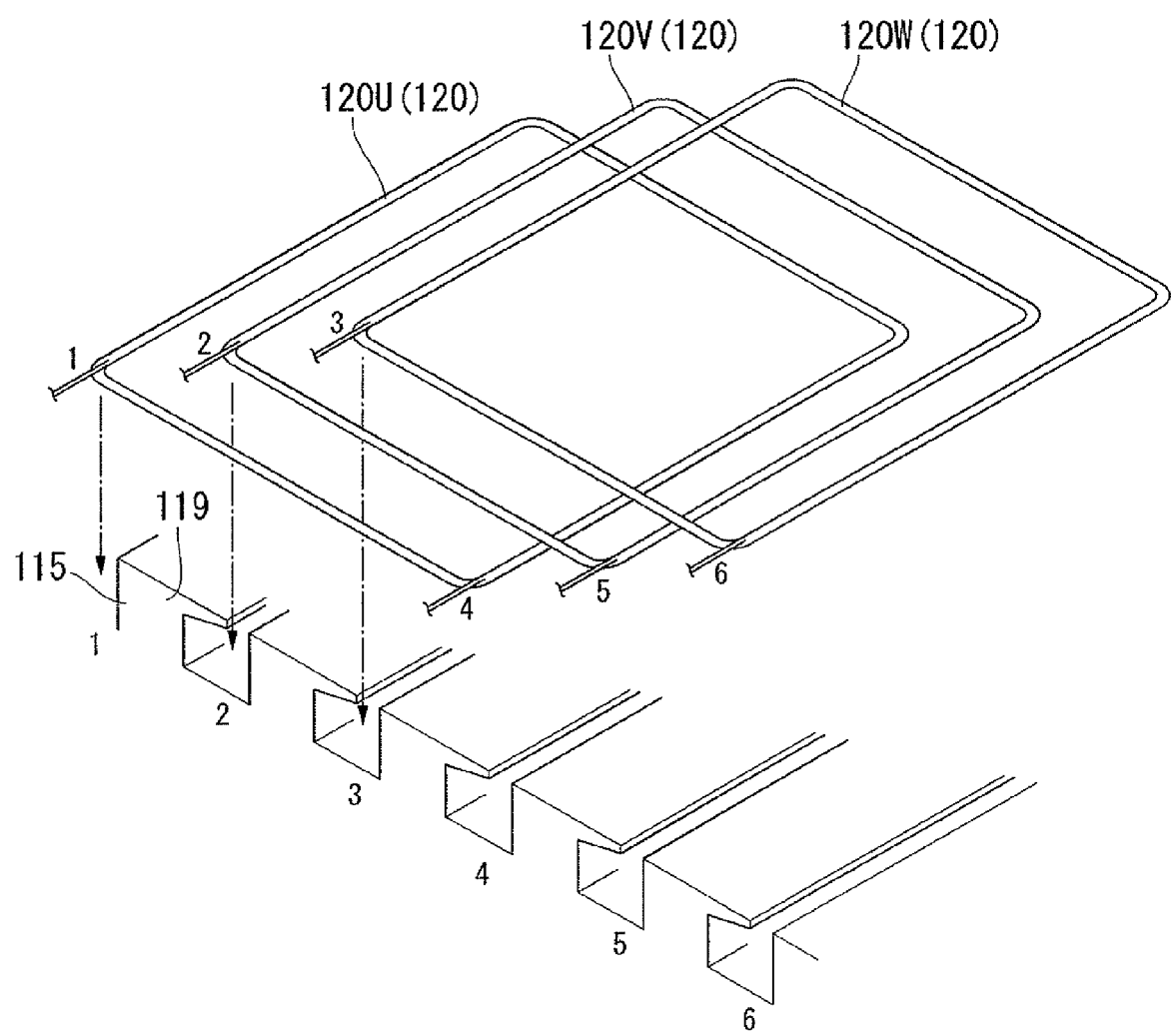
FIG. 28 is a perspective view illustrating a method for arranging the coil in the third embodiment of the present invention.
Figure 29:
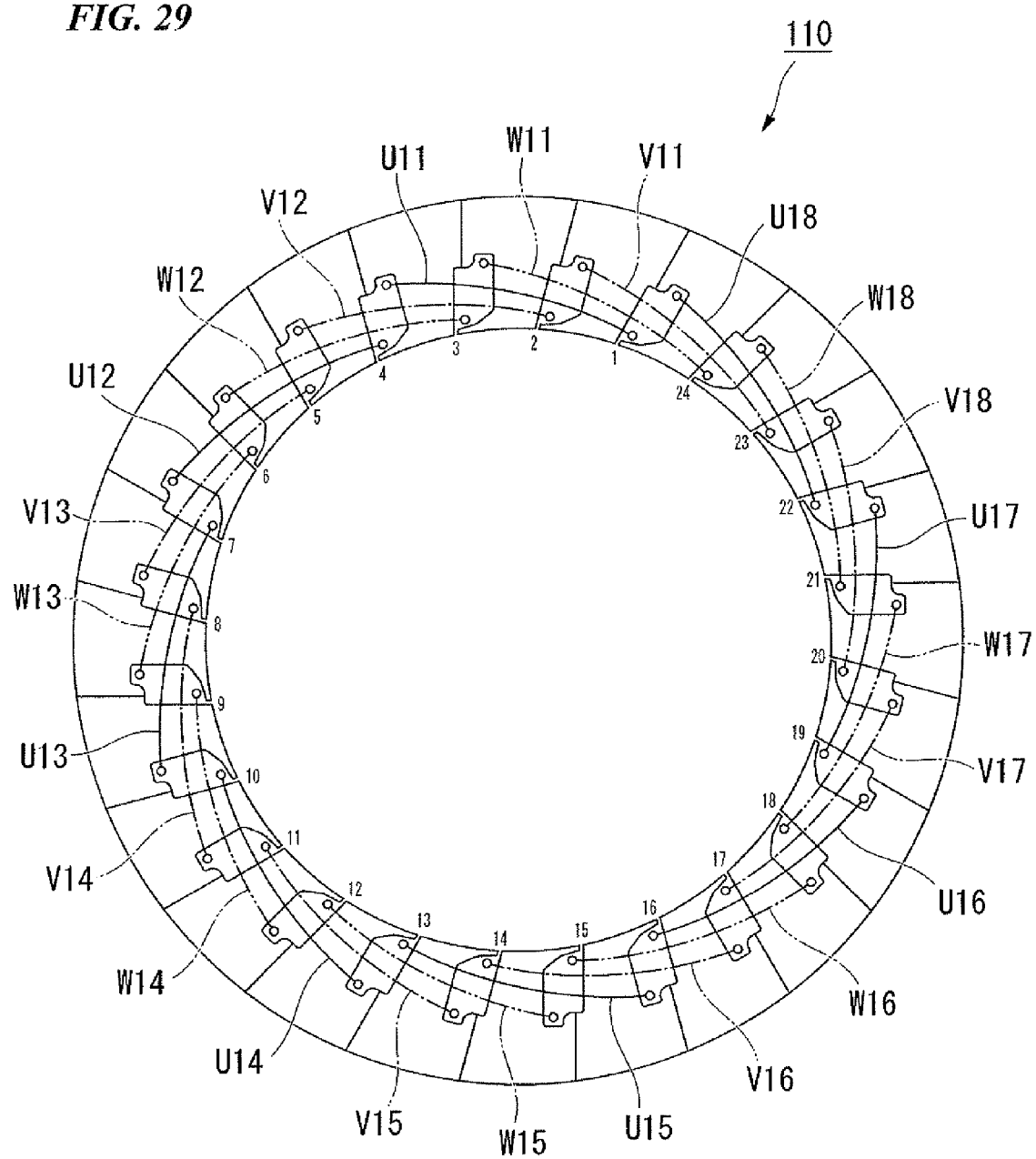
FIG. 29 is a schematic plan view showing the core pieces arrayed in a cylindrical shape in the third embodiment of the present invention.

FIG. 28 is a perspective view showing the arrangement the coils. FIG. 29 is a plan view showing a core piece disposed in a cylindrical shape.

In the third embodiment, prior to disposing the plurality of core pieces into a cylindrical shape, the coil is inserted into the band-shaped core piece. The following description will make reference to FIG. 29 which illustrates the plurality of core pieces arranged into a cylindrical shape.

As shown in FIGS. 28 and 29, the first portion of the ring V11 of the coil 120V that forms the V phase is inserted into the slot number 2. At this time, the second portion of the ring V11 (the position indicated by reference numeral A in FIG. 26B) is not inserted into the slot number 23.

Next, the first portion of the ring W11 of the coil 120W that forms the W phase is inserted into the slot number 3. At this time, the second portion of the ring W11 (the position indicated by reference numeral B in FIG. 26C) is not inserted into the slot number 24.

Next, the first portion of the ring U11 of the coil 120U that forms the U phase is inserted into the slot number 4. At this time, the second portion of the ring U11 is provisionally inserted into the slot number 1.

Next, the ring V12 of the coil 120V that forms the V phase is inserted to bridge the slot number 2 and the slot number 5.

With respect to the ring V12, the ring V12 is inserted into the slot number 5, and then the ring V12 is inserted into the slot number 2 to thereby arrange the ring V12.

In the manner of insertion as described above, it is possible to smoothly insert the ring V12 into the slot without interference with the claw portion 130.

In the same manner, after inserting the ring W12 of the W-phase coil 120W to bridge the slot number 3 and the slot number 6, the ring U12 of the U-phase coil 120U is inserted to bridge the slot number 4 and the slot number 7.

This sequence is repeated so that V13→W13→U13→V14→ . . . →V18→W18→W13→U18 are inserted respectively into the slot 119.

When the coil 120 is inserted into the slot 119 in this manner, the coils 120U, 120V, and 120W are disposed so that the coil end portion 135U (first coil end portion), the coil end portion 135V (second coil end portion), and the coil end portion 135W (third coil end portion) that protrude to an outer side of the stator core 110 from both axial end faces of the stator core 110 mutually crossover.

Figure 30:
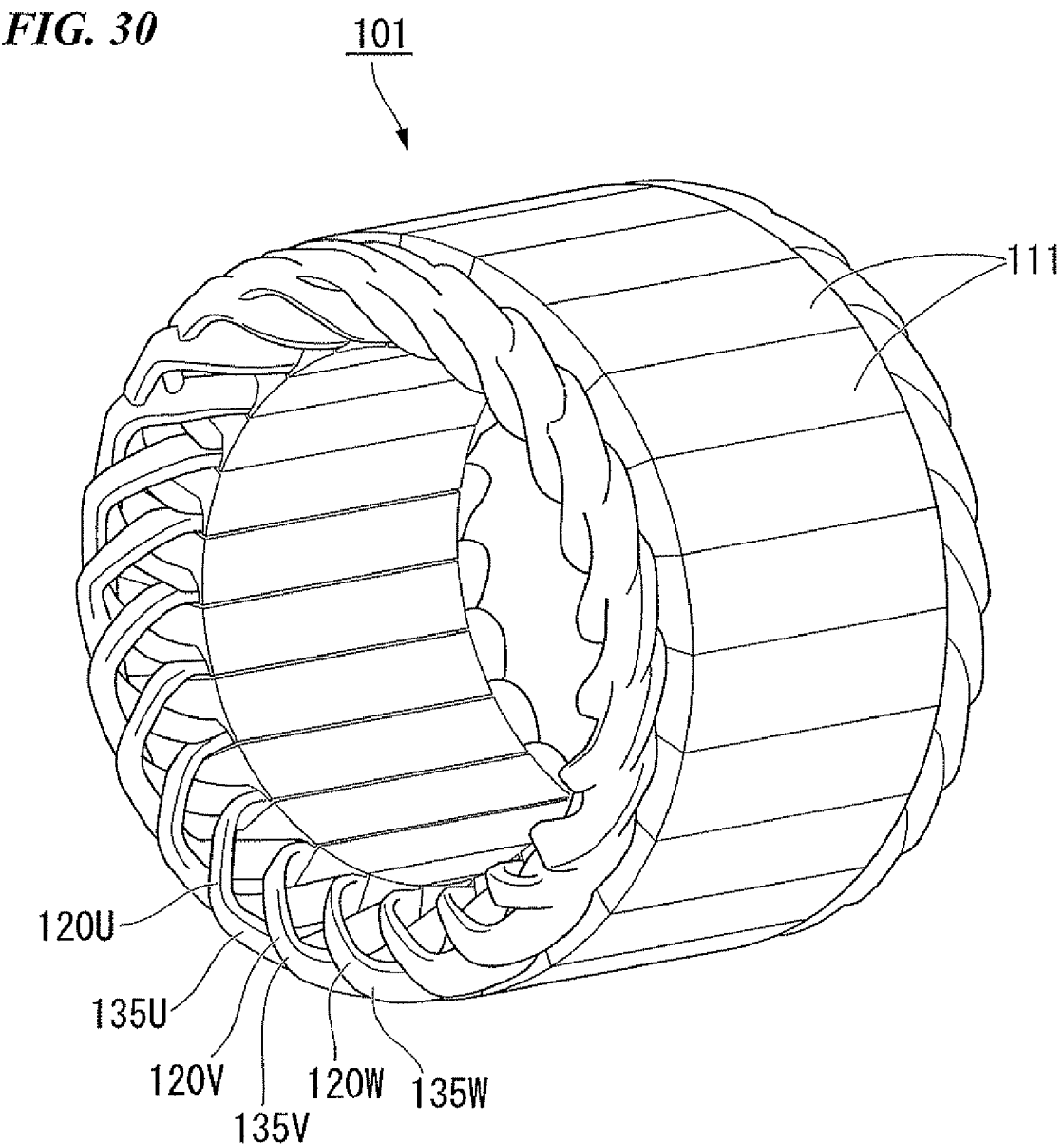
FIG. 30 is a perspective view showing the stator of the third embodiment of the present invention.

The band-shaped core piece 111 is deformed into a cylindrical shape with a configuration in which the position of the ring V11 indicated by reference numeral A and the position of the ring W11 indicated by reference numeral B are not inserted into the slot 119. Furthermore, in the plurality of core pieces 111 arranged into a band shape, the core pieces 111 disposed on both ends are connected with each other, and the plurality of core pieces 111 are thereby arranged into a cylindrical shape as shown in FIG. 30.

Then, if required, after removing the ring U11 which was provisionally inserted into the slot number 1, the ring V11 of the V-phase coil 120V that is not inserted into the slot 119 (the position indicated by reference numeral A in FIG. 26B) is inserted into the slot number 23.

Thereafter, the ring W11 of the W-phase coil 120W (the position indicated by reference numeral B in FIG. 26A) is inserted into the slot number 24. When the coils 120 are inserted into all the slots 119, the stator 101 is inserted into a housing (not shown).

After adjusting the lead line so that there is no looseness in each coil 120U, 120V, and 120W inserted into the slot 119, the lead line that extends from both end portions of each coil 120U, 120V, and 120W is connected to the U phase, the V phase, and the W phase power terminals and the ground terminal.

The method of inserting the coil 120 into the slot 119 will now be described in further detail.

Although a method of inserting the ring U11 into the slot 119 will be described, the same method is used for insertion into the other rings V11 and W11.

Figure 31:
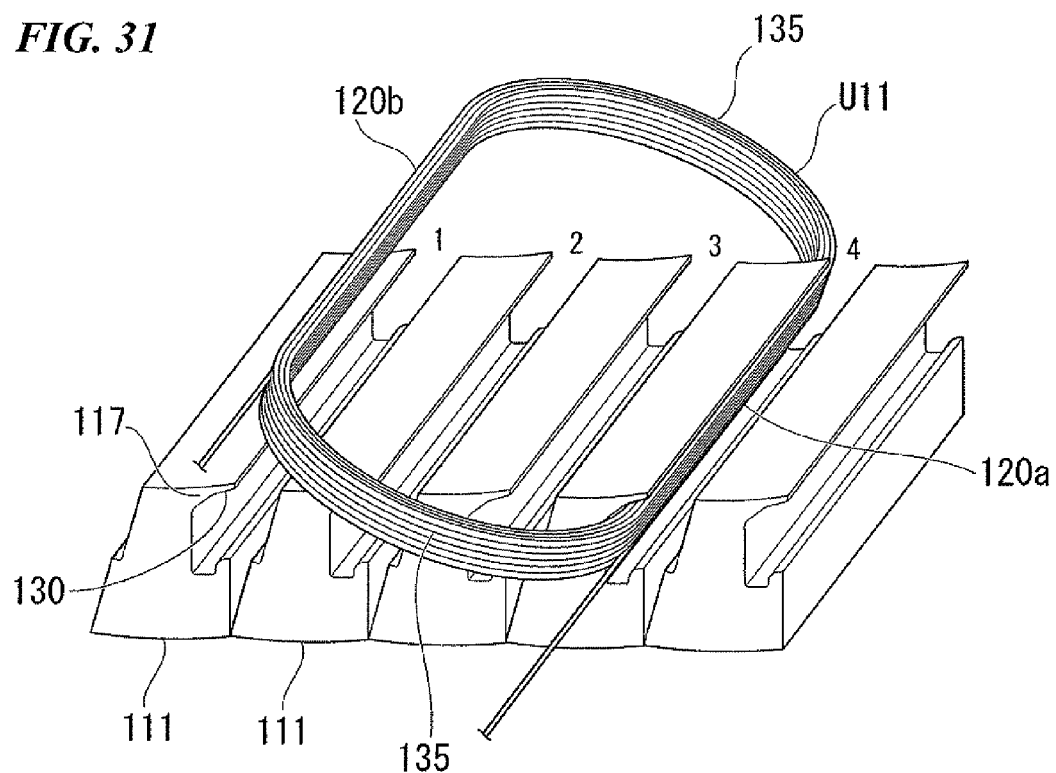
FIG. 31 is an explanatory diagram illustrating a method for attaching the core pieces on the coil in the third embodiment of the present invention.

As shown in FIG. 31, the claw portion 130 is formed on only one side portion of the two side portions that form the distal end portion 117 of the core piece 111.

When inserting the ring U11, firstly, the first portion 120a of the ring U11 is inserted into the slot number 4 (first slot portion).

Figure 32:
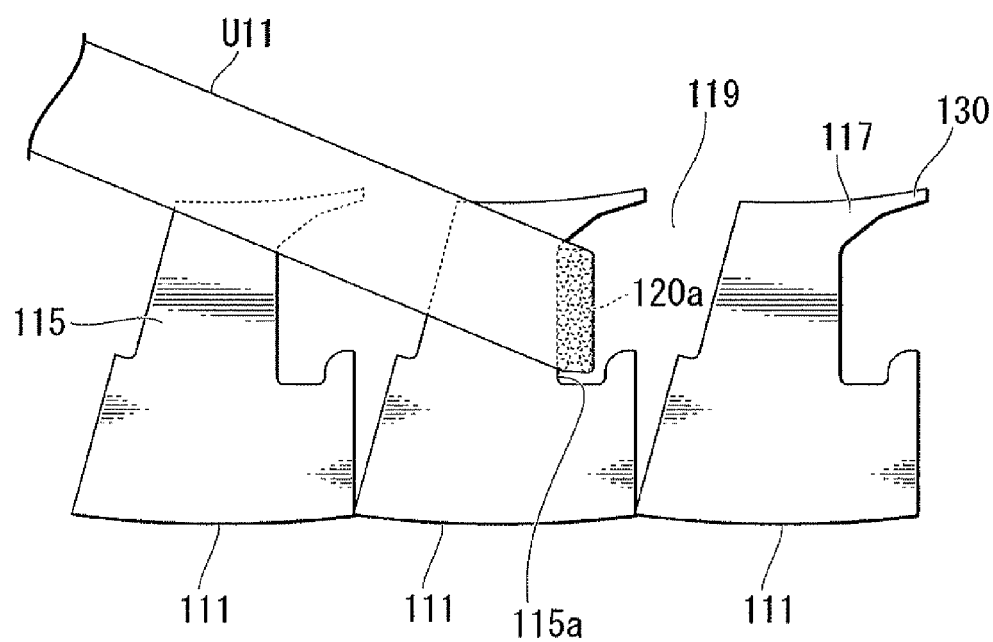
FIG. 32 is an explanatory diagram illustrating a method for attaching the core pieces on the coil in the third embodiment of the present invention.

Next, as shown in FIG. 32, the first portion 120a of the ring U11 is in contact with the side face 115a (the side face of the teeth 115) which is proximate to the position at which the slot number 1 is disposed in the slot 119.

Figure 33:
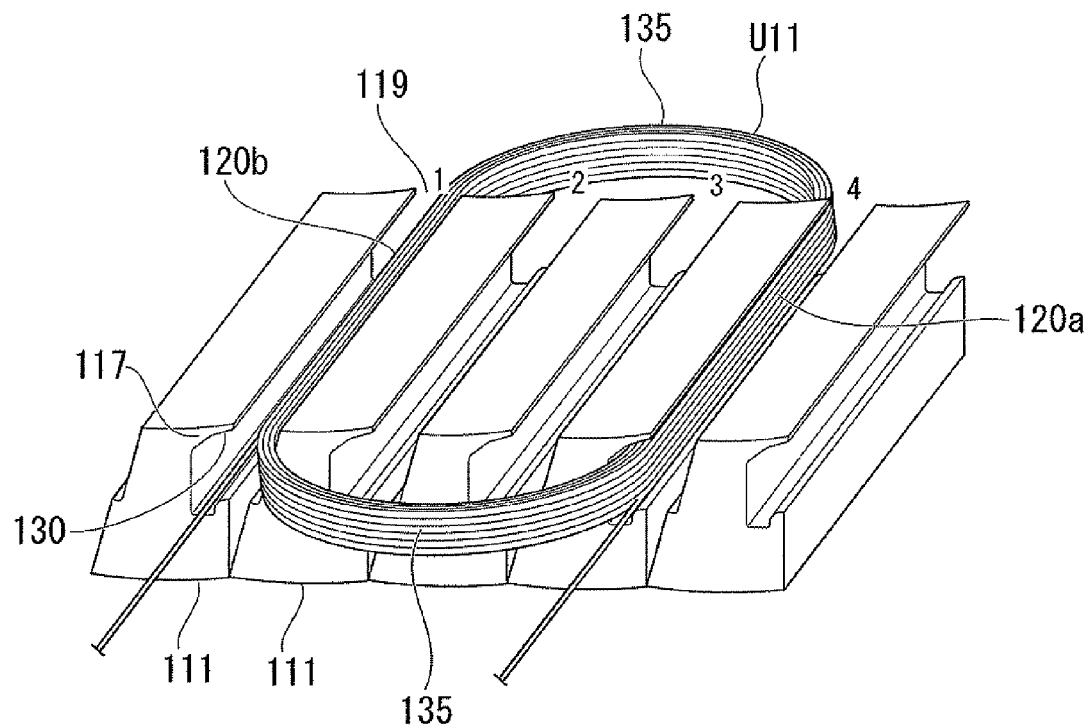
FIG. 33 is an explanatory diagram illustrating a method for attaching the core pieces on the coil in the third embodiment of the present invention.

Next, as shown in FIG. 33, the second portion 120b of the ring U11 is inserted into the slot number 1 (second slot portion).

The size of the ring U11 is set so that, in the slot 119, the ring U11 slightly avoids from being contacted with the side portion on which the claw portion 130 is not formed and which is one of the two side portions that form the distal end portion 117, and the ring U11 slightly avoids from being contacted with the distal corner positioned with the upper portion of the distal end portion 117.

This configuration enables shortening of the length of the coil end portion 135 of the coil 120.

Figure 34:
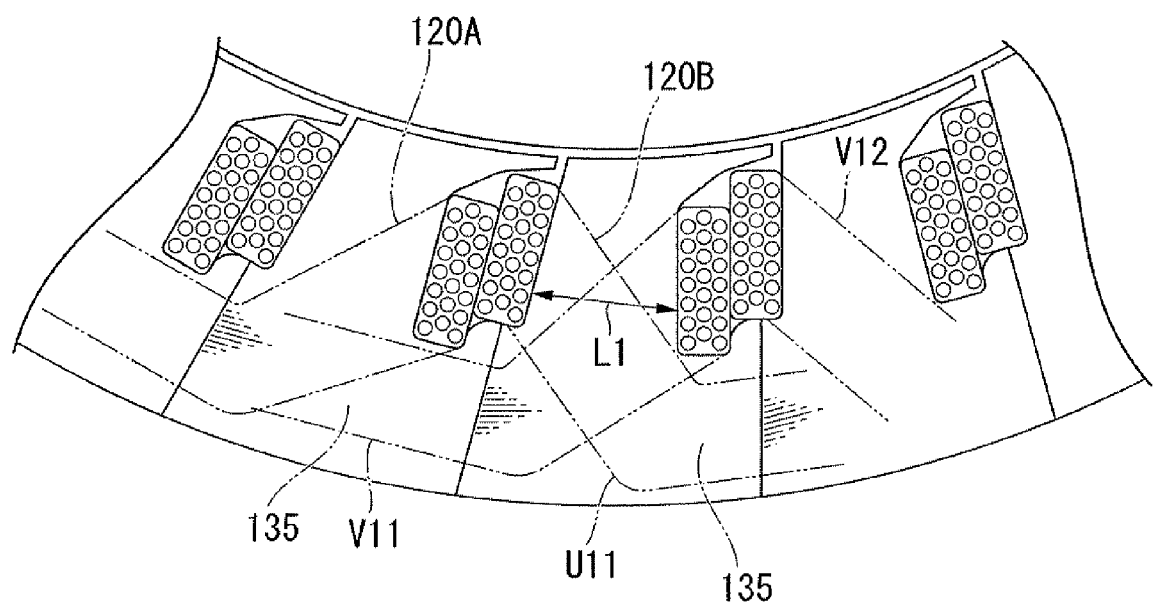
FIG. 34 is a plan view illustrating an effect when the coils were attached to the core pieces in the third embodiment of the present invention.

In addition, as shown in FIG. 34, by arranging two coils 120 having the same phase in one of slots 119, it is possible reduce the number of core pieces 111 which is half the number of core pieces used in the first embodiment. Therefore, since the number of slots 119 becomes a half, it is possible to increase the distance L between the slots 119 that are adjacent to each other. In this structure, for example, the ring U11 protruding from the slot 119 is intersected with the ring V11 protruding from the slot 119 at the coil end portion 135. However, since the distance L is sufficiently-obtained, it is not necessary to sharply bend the coil 120, and a stress is not generated in the coil 120, and it is possible to intersect the ring U11 with the ring V11.

Figure 35A:
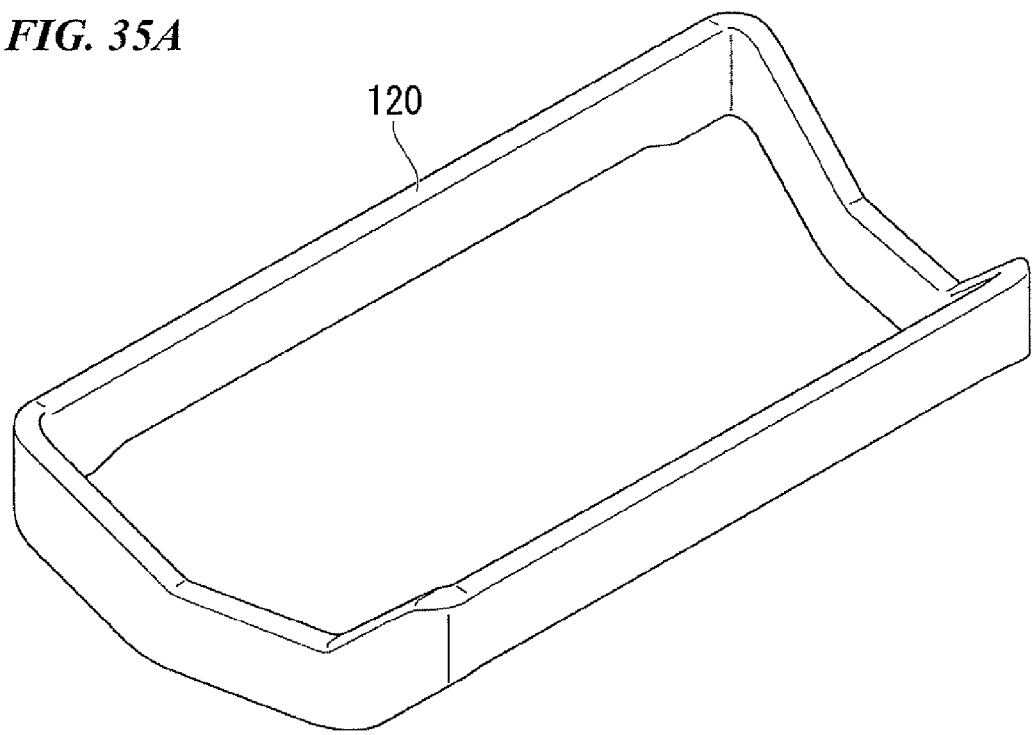
FIG. 35A is a diagram illustrating a difference between a structure of the third embodiment of the present invention and a conventional structure, and showing the structure of the third embodiment of the present invention.
Figure 35B:
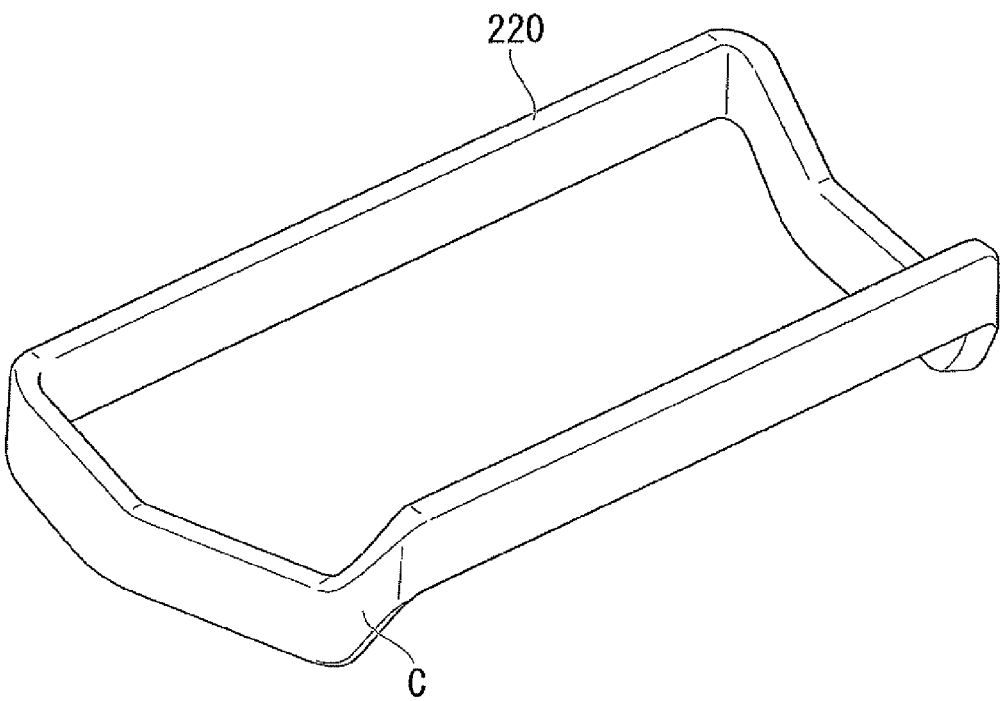
FIG. 35B is a diagram illustrating a difference between a structure of the third embodiment of the present invention and a conventional structure, and showing the conventional structure.
Figure 44:
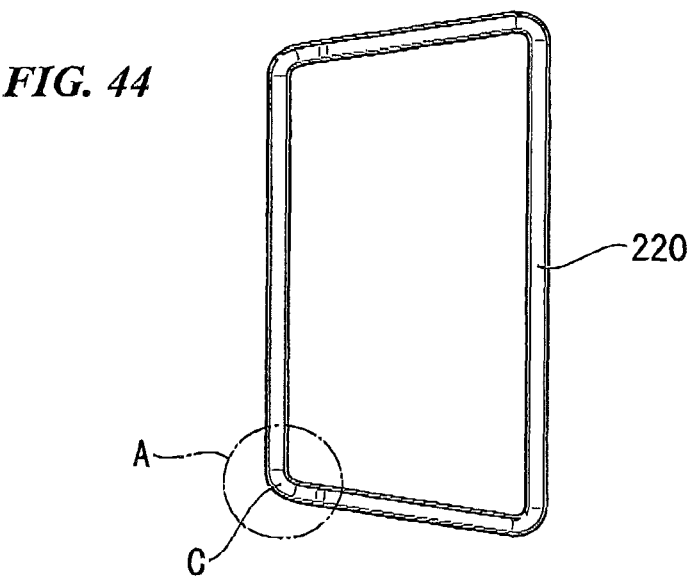
FIG. 44 is an explanatory diagram illustrating the coil in the structure shown in FIG. 40.
Figure 45:
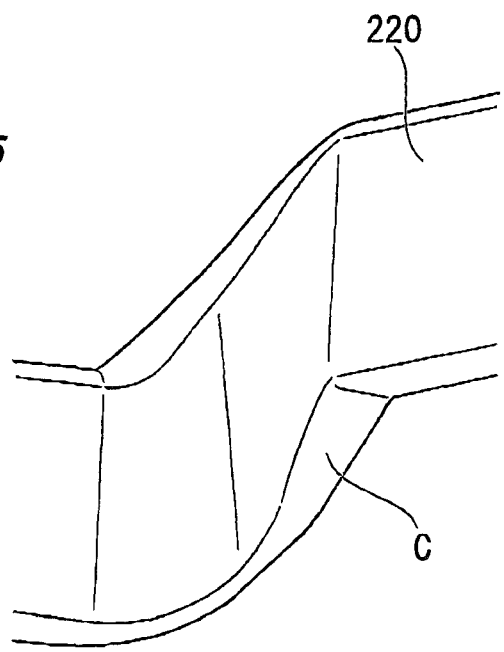
FIG. 45 is an enlarged view showing a portion represented by reference numeral A shown in FIG. 44.

That is, in a conventional coil 220 as shown in FIG. 35B (refer to FIGS. 44 and 45), a curved portion C that is sharply bent is formed. In contrast, in the coil 120 of the third embodiment as shown in FIG. 35A, the curved portion C that is formed in the conventional coil 220 is not generated, and it is thereby possible to reduce pressure on the coil 120.

In other hands, regarding the coil end portion 135, in terms of an angle between a linear portion formed along a direction in which the yoke 113 is extended and a sloped portion that is extended from the linear portion to the slot 119, the coil 120 is gradually bent, compared with the curved portion C of the coil 220 having that are sharply bent.

As described above, cylindrical coils 120 having a size which corresponds to the slot 119 are formed by winding a lead line in advance, mounting of the coil 120 can be executed by merely inserting the ring-shaped coil 120 into the slot 119.

Thus, productivity can be improved in comparison to forming a coil while winding a lead line onto the slot 119 after preparing a core piece 111.

The third embodiment is configured so that all the coils 120 (120U, 120V, and 120W) which configure the U phase, the V phase, and the W phase which form a rotating magnetic field for the motor have the same shape. When manufacturing a three-phase motor having a U phase, V phase, and W phase, the coils 120 (120U, 120V, and 120W) which correspond to each phase can be manufactured using the same process. Therefore, productivity can be improved.

According to the third embodiment, by inserting two coils 120 having the same phase into one slot 1119, it is possible to increase the distance L between the slots 119 that are adjacent to each other. Therefore, it is possible to reduce the deformation amount of the coil end portion 135 of the coil 120. As a result, it is possible to prevent damage to the coating of the lead line forming the coils 120 and to ensure the insulation characteristics of the coils 120.

In addition, when inserting coils 120 into the slot portions 190, since the claw portion 130 is only formed on one side portion of the two side portions that form the distal end portion 117 of the teeth 115, it is not necessary to insert the coils into the slots 119 while avoiding the claw portion 130. Because of this, it is possible to shorten the overall length of the coils 120.

Thus, resistance produced by the coil 120 can be reduced and it is possible to substantially suppress the height of the coil end portion 135 of the coil 120 that protrudes from both axial end faces of the stator core 110 towards an outer side of the stator core 110.

In addition, the step portion 137 is formed so that, in two coils 120 inserted into one slot 119 and having the same phase, the position of one coil 120 is shifted from the position of the other coil 120 in the radial-inner direction. Therefore, it is possible to further reduce the deformation amount of the coil 120.

As a result, it is possible to efficiently prevent damage to the coating of the lead line forming the coils 120 and to ensure the insulation characteristics of the coils 120.

Furthermore, the claw portion 130 is only formed on one side portion of the two side portions that form the distal end portion 117 of the teeth 115, and the first inclined face 132 and the second inclined face 133 are formed. Therefore, the width of the claw portion increases at a maximum, and it is possible to reduce torque ripple.

Modified Example of the Third Embodiment

Figure 36:
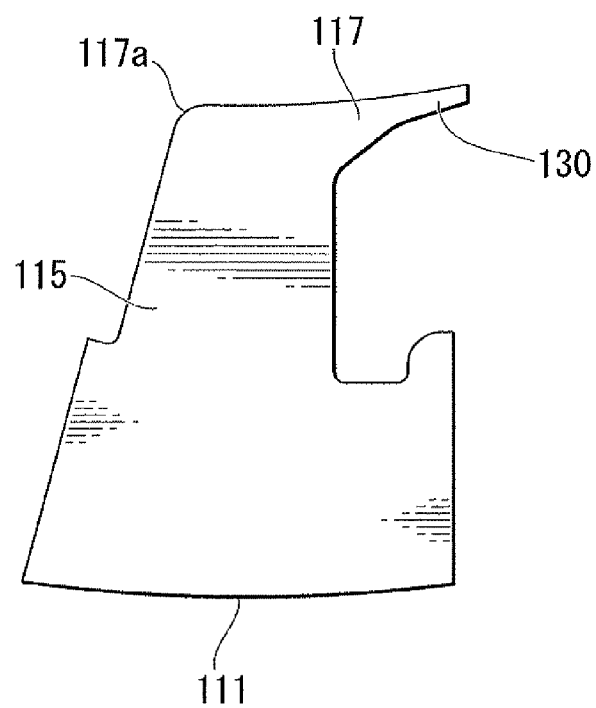
FIG. 36 is a plan view partially showing a modified example of a distal end of a teeth portion in the third embodiment of the present invention.
Figure 37:
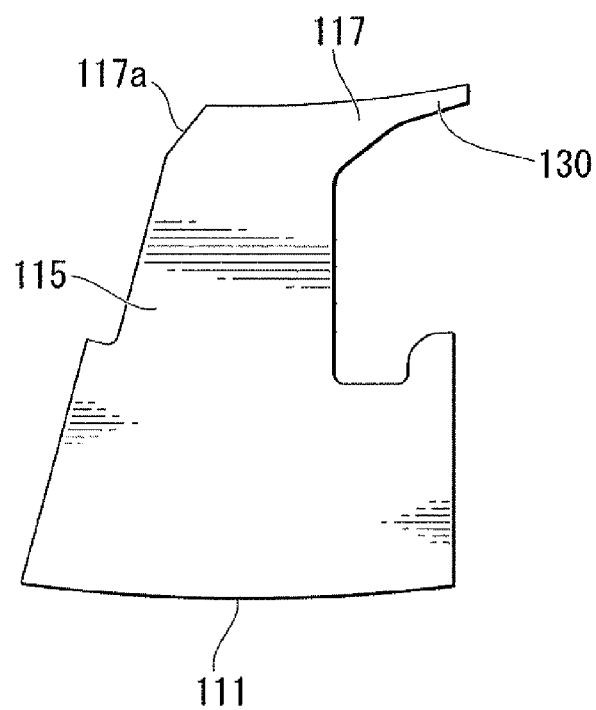
FIG. 37 is a plan view partially showing a modified example of a distal end of a teeth portion in the third embodiment of the present invention.
Figure 38:
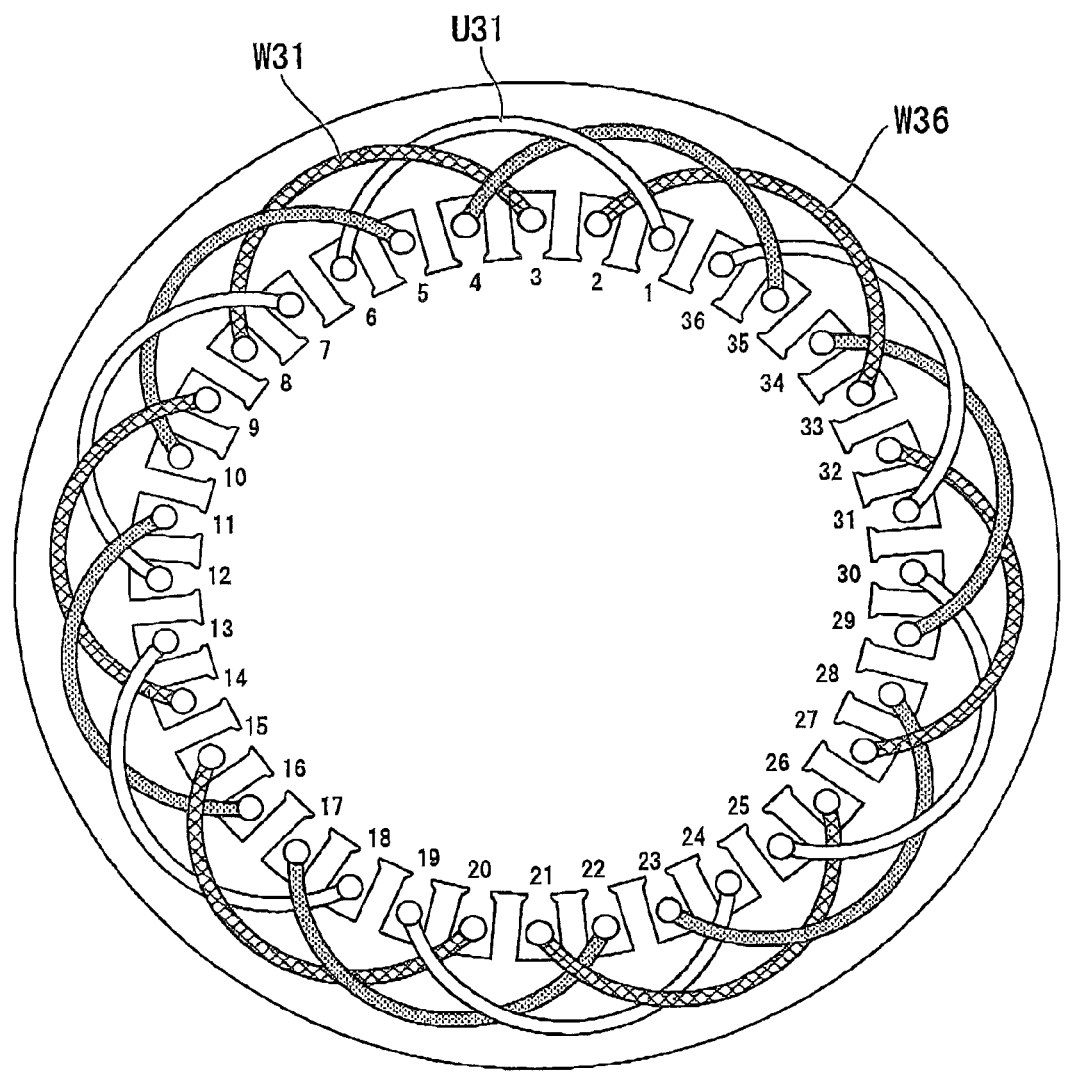
FIG. 38 is a plan view showing a conventional stator.
Figure 39:
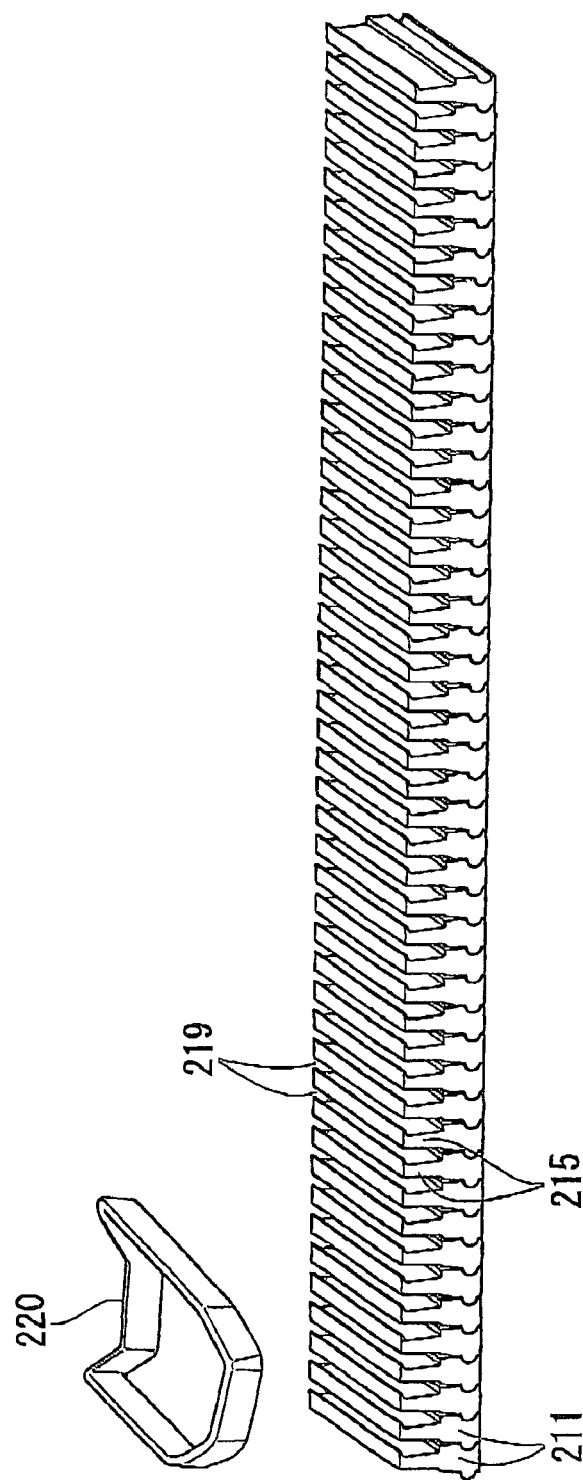
FIG. 39 is an explanatory diagram illustrating a method for attaching the coil on conventional core pieces that are arrayed in a band orientation.
Figure 40:
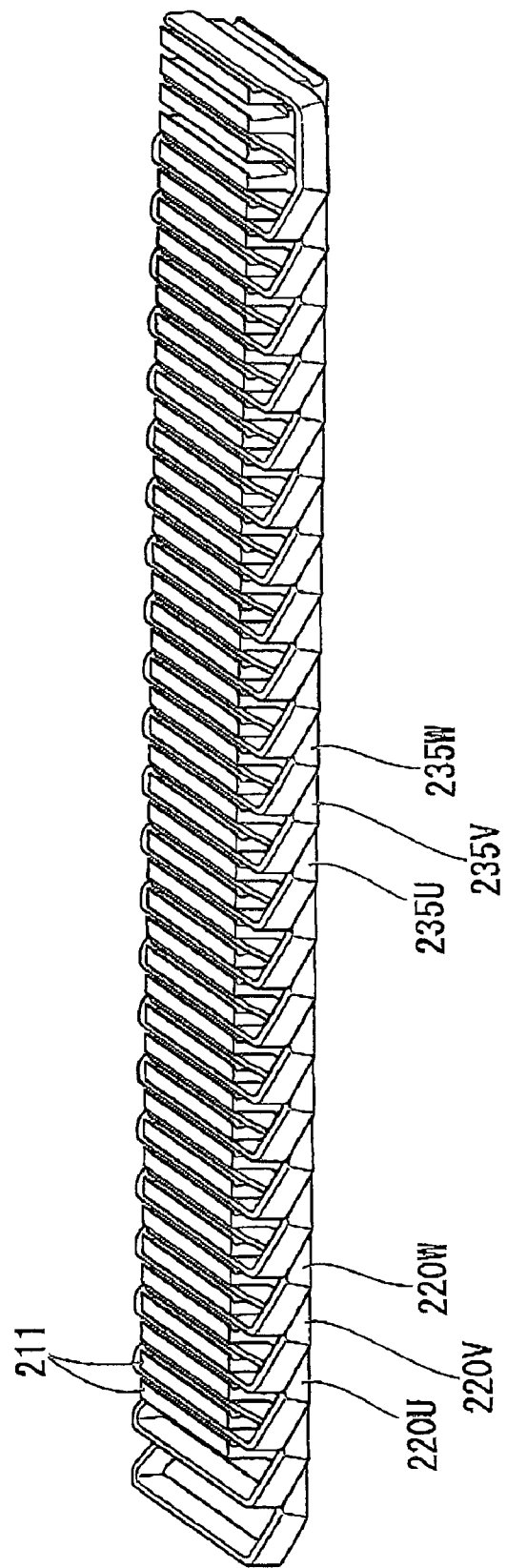
FIG. 40 is an explanatory diagram illustrating a method for attaching the coils on conventional core pieces that are arrayed in a band orientation.
Figure 41:
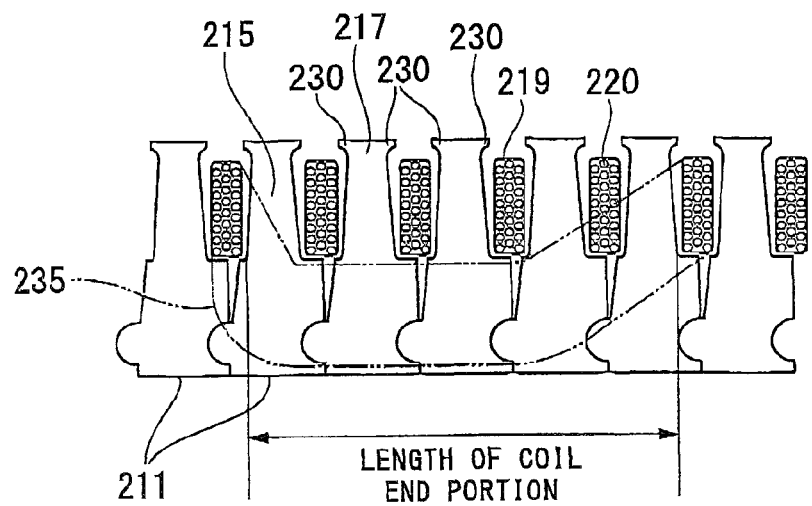
FIG. 41 is an explanatory diagram illustrating a state where the coils are attached on conventional core pieces that are arrayed in a band orientation.
Figure 42:
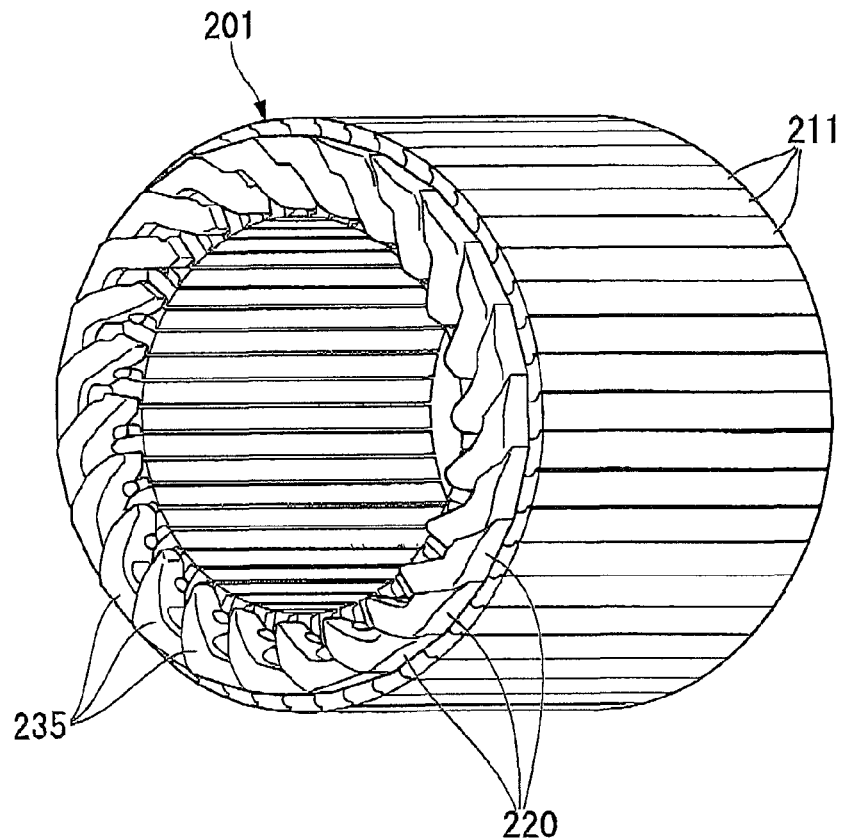
FIG. 42 is an explanatory diagram illustrating a state where conventional core pieces on which the coils were attached and which were arrayed in a band orientation are transformed in a cylindrical shape.
Figure 43:
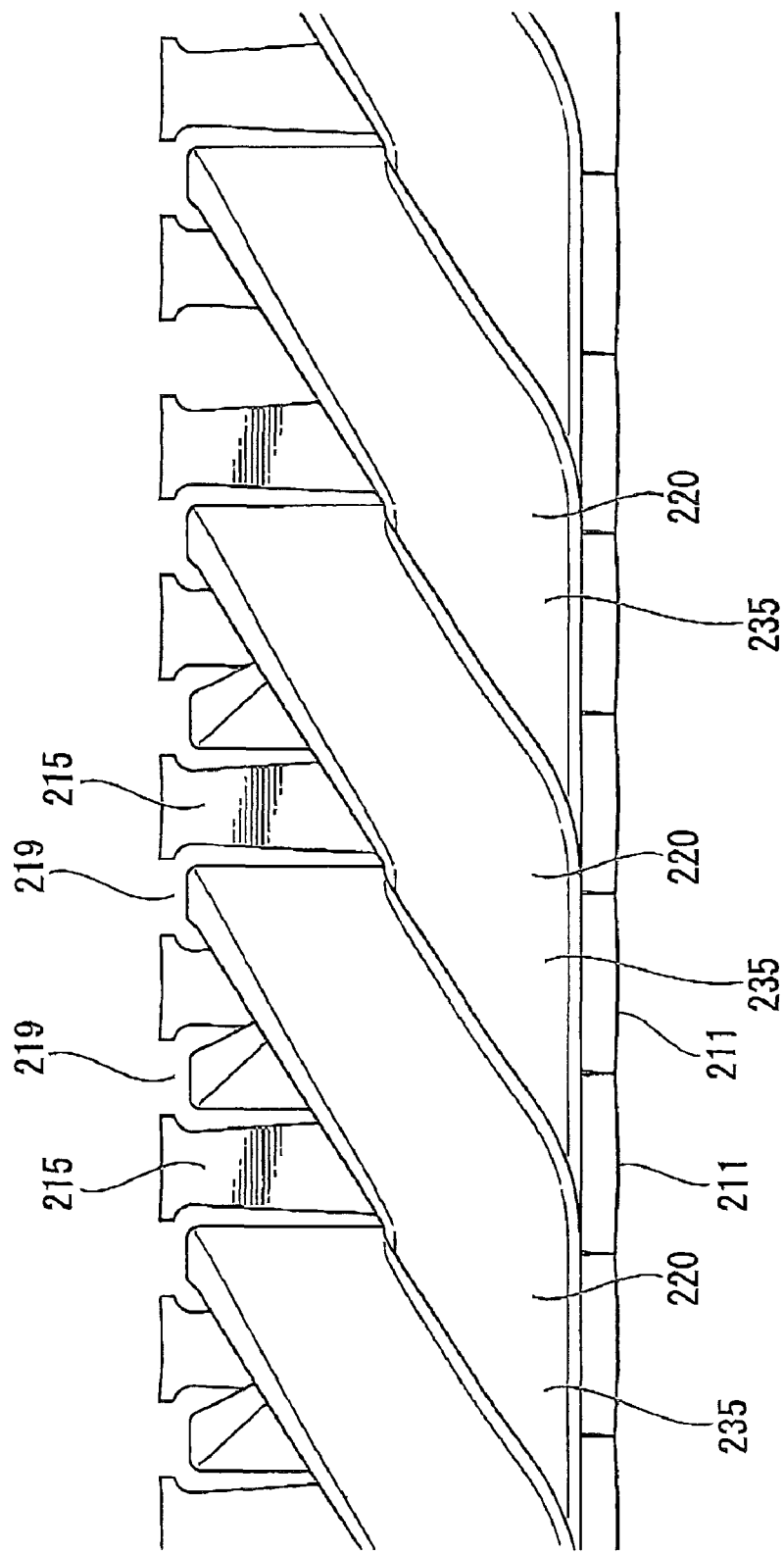
FIG. 43 is an explanatory diagram illustrating a state where the coils were attached on conventional core pieces and the core pieces were arrayed in a band orientation.

As a modified example of the third embodiment, a corner portion 117a may be formed between the side portion on which the claw portion 130 is not formed of the two side portions forming the distal end portion 117 of the core piece 111 and the distal end corner portion positioned at the upper portion of the distal end portion 117. For example, as shown in FIG. 36, the corner portion 117a may have a curved shape. Furthermore, as shown in FIG. 37, the face of the corner portion 117a may be chamfered. Formation of the corner portion 117a in this manner enables effective prevention of damage to the coil 120 when inserting the coils 120 into the slot 119.

While preferred embodiments of the present invention have been described and illustrated above, it should be understood that these are exemplary of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the appended claims.

What is claimed is:

1. A motor comprising:
a stator including a stator core, a plurality of slot portions, and a plurality of coils, the stator core including a plurality of stator core pieces, the stator core piece including a teeth portion having a distal end portion and two side portions, a yoke portion, and a claw portion formed at one of the two side portions and at the distal end portion, the plurality of stator core pieces being connected so that a plurality of claw portions protrude in the same circumferential direction, the stator core thereby being formed in a cylindrical shape, each of the slot portions being formed between adjacent teeth portions and formed between the plurality of stator core pieces, the plurality of coils being inserted into the plurality of slot portions, the plurality of coils including a first coil, a second coil, and a third coil which form three phases, the first coil, the second coil, and the third coil being bridged between two of the slot portions, the first coil including a first coil end portion that protrudes from an edge face of the stator core in an axial direction, the second coil including a second coil end portion that protrudes from the edge face of the stator core in the axial direction, and the third coil including a third coil end portion that protrudes from the edge face of the stator core in the axial direction, the first coil, the second coil, and the third coil being arranged so that the first coil end portion, the second coil end portion, and the third coil end portion are intersected with each other, wherein
the coils include a first portion and a second portion that is opposite to the first portion;
in two slot portions, the first portion is inserted into one of the slot portions, and the second portion is inserted into the other of the slot portions;
in two coils that are adjacent to each other and have the same phase, the first portion of one of the coils and the second portion of the other of the coils are inserted into one slot portion; and wherein
each of the plurality of stator core pieces has the claw portion that is formed only at one of two side portions at the distal end portion of the teeth portion;
the claw portion has a side face facing the slot portion;
the side face has a first inclined face and a second inclined face, the first inclined face being formed toward a distal end of the claw portion from the teeth portion, and the second inclined face being consecutively connected and formed so as to extend toward the distal end of the claw portion; and
an angle between the first inclined face and a side face of the slot portion is less than an angle between the second inclined face and the side face of the slot portion.

2. A motor comprising:
a stator including a stator core, a plurality of slot portions, and a plurality of coils, the stator core including a plurality of stator core pieces, the stator core piece including a teeth portion having a distal end portion and two side portions, a yoke portion, and a claw portion formed at one of the two side portions and at the distal end portion, the plurality of stator core pieces being connected so that a plurality of claw portions protrude in the same circumferential direction, the stator core thereby being formed in a cylindrical shape, each of the slot portions being formed between adjacent teeth portions and formed between the plurality of stator core pieces, the plurality of coils being inserted into the plurality of slot portions, the plurality of coils including a first coil, a second coil, and a third coil which form three phases, the first coil, the second coil, and the third coil being bridged between two of the slot portions, the first coil including a first coil end portion that protrudes from an edge face of the stator core in an axial direction, the second coil including a second coil end portion that protrudes from the edge face of the stator core in the axial direction, and the third coil including a third coil end portion that protrudes from the edge face of the stator core in the axial direction, the first coil, the second coil, and the third coil being arranged so that the first coil end portion, the second coil end portion, and the third coil end portion are intersected with each other, wherein a step portion formed on an inner peripheral face facing the slot portion in the yoke portion, wherein the coils include a first portion and a second portion that is opposite to the first portion;

in two slot portions, the first portion is inserted into one of the slot portions, and the second portion is inserted into the other of the slot portions;

in two coils that are adjacent to each other and have the same phase, the first portion of one of the coils and the second portion of the other of the coils are inserted into one slot portion; and wherein in two coils that are adjacent to each other, have the same phase, and constitutes each of the first coil, the second coil, and the third coil, the position of the first portion of one of the coils is shifted from the position of the second portion of the other of the coils in a radial direction.

3. The motor according to claim 2, wherein each of the plurality of stator core pieces has the claw portion that is formed only at one of two side portions at the distal end portion of the teeth portion;

the claw portion has a side face facing the slot portion;

the side face has a first inclined face and a second inclined face, the first inclined face being formed toward a distal end of the claw portion from the teeth portion, and the second inclined face being consecutively connected and formed so as to extend toward the distal end of the claw portion; and an angle between the first inclined face and a side face of the slot portion is less than an angle between the second inclined face and the side face of the slot portion.

* * * * *